United States Patent Office 3,554,886
Patented Jan. 12, 1971

3,554,886
RADIATION CURED NORBORNENE POLYMERS
Henry O. Colomb, Jr., and David J. Trecker, South Charleston, W. Va., assignors to Union Carbide Corporation, New York, N.Y., a corporation of New York
No Drawing. Continuation-in-part of application Ser. No. 697,635, Jan. 15, 1968. This application Mar. 4, 1969, Ser. No. 804,279
Int. Cl. B01j 1/10, 1/12
U.S. Cl. 204—159.12                22 Claims

ABSTRACT OF THE DISCLOSURE

Polymers containing a norbornenyl group are readily crosslinked by irradiation to produce insoluble products. The crosslinked products are useful as coatings on wood, metal, etc., as self-supporting films, wire insulation, for the treatment of fabrics to render them more durable and crease resistant, as well as in the many known areas in which synthetic polymers are employed such as the production of molded and extruded shaped articles.

---

This application is a continuation-in-part of application Ser. No. 697,635, filed Jan. 15, 1968, now abandoned.

This invention relates to crosslinkable and crosslinked polymers containing the aliphatic norbornenyl group as the crosslinking site.

Polymers of norbornene have previously been prepared. However, it has not heretofore been known that certain polymers thereof can be crosslinked by irradiation to render them stiffer, stronger and tougher and to enhance their tear and abrasion resistance properties.

It has now been found that certain norbornene polymer can be crosslinked by irradiation. The radiation convertible, crosslinkable polymers are those which have the unsaturated norbornenyl group in the molecule. The norbornenyl group can be in the polymer backbone, in which case we term the polymer a "backbone radiation convertible polymer," or the norbornenyl group may be pendant to the polymer backbone, in which case we term the polymer a "pendant radiation convertible polymer." These two terms are more fully defined below, and generic thereto the term "radiation convertible polymer" is used for the purposes of this invention. Thus, wherever the term "radiation convertible polymer" appears in the description or claims, it encompasses both sub-classes.

Crosslinking of the radiation convertible polymers is induced by radiation. Two types of radiation are suitable—ionizing radiation, either particulate or non-particulate, and non-ionizing radiation. As a suitable source of particulate radiation, one can use any source which emits electrons or charged nuclei. Particle radiation can be generated from electron accelerators such as the Van de Graaff, resonance transformers, linear accelerators, insulating core transformers, radioactive elements such as cobalt 60, strontium 90, etc. As a suitable source of non-particle ionizing radiation, one can use any source which emits radiation in the range of from about $10^{-3}$ angstroms, to about 2000 angstroms, preferably from about $5 \times 10^{-3}$ angstroms to about 1 angstrom. Suitable sources are vacuum ultraviolet lamps, such as xenon or krypton arcs, and radioactive elements such as cesium-137, strontium-90, and cobalt-60. The nuclear reactors are also known to be a useful source of radiation. As a suitable source of non-ionizing radiation, one can use any source which emits radiation of from about 2000 angstroms to about 8000 angstroms, preferably from about 2500 angstroms to about 4500 angstroms. Suitable sources are mercury arcs, carbon arcs, tungsten filament lamps, xenon arcs, krypton arcs, sunlamps, lasers, and the like.

All of these devices and sources are well known in the art and those familiar with the technology are fully aware of the manner in which the radiation is generated and the precautions to be exercised in its use.

As is known, irradiation of a polymer with a Van de Graaff accelerator is generally completed in a matter of seconds, even at the highest megarad dosages used in the examples herein. This is to be compared to irradiation periods of hours when a mercury arc is the source of energy.

The ionizing radiation dosage necessary to effect crosslinking will vary depending upon the particular polymer that is undergoing radiation, the extent of crosslinking desired, the number of crosslinkable sites available and the molecular weight of the starting polymer. The total dosage will be from about $10^3$ rads to $10^8$ rads, preferably from $5 \times 10^3$ rads to $10^7$ rads. A rad is 100 ergs of ionizing energy absorbed per gram of material being irradiated.

The radiation is carried out at a temperature below the decomposition temperature of the resin undergoing treatment, generally it is preferably from about $-80°$ C. to about $125°$ C.

To prevent undesirable side reactions, an inert atmosphere is present; however, this is not critical and the reaction can be carried out under ambient atmospheric conditions.

The crosslinkable norbornenyl polymer can be irradiated in bulk, in solution, in emulsion or dispersion, as a finely ground material or formed article, as a self-supporting film, as a coating or film on a substrate such as a fabric, wood, glass, metal, etc., or in any other form. In a typical operation the crosslinkable radiation convertible polymer is exposed to the chosen radiation source for the selected period of time until the desired amount of crosslinking has taken place. The intensity of the radiation will affect the time needed to achieve a desired amount of crosslinking. If desired a known photosensitizer such as acetophenone, propiophenone, acetone, xanthone, and the like, can be present to accelerate the crosslinking reaction when ultraviolet or visible light are the radiation source. These photosensitizers are generally present at concentrations below about 10 percent by weight and can be as low as 0.05 percent. The extent to which crosslinking occurs can be determined from the amount of insolubilization that is observed or the increase in the weight average molecular weight. The greater the amount of insoluble polymer, the greater is the extent of crosslinking achieved, and the percent insolubilization is considered to be the extent of crosslinking achieved.

In the specification the compounds are discussed as the norbornene compounds having the basic ring structure

for purposes of simplicity and description solely. Equally suitable, and included within the scope of this invention, however, are the tetracyclo compounds of the ring structure

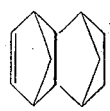

and the specification and claims should so be read. The two classes are subgeneric to the generic structure

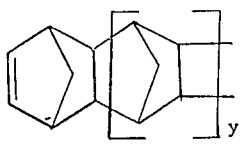

in which y is 0 or 1.

The principal unobvious and unexpected advantages observed with these polymers are their remarkable susceptibility to radiation-induced curing, their oxidative stability (hence, they are stable and curing can be brought about when desired) and their equal ease of crosslinking by several modes of initiation (electrons, X-rays, photons, etc.). These features render them superior to known classes of radiation-sensitive groups on polymers, e.g., cinnamates, stilbenes, and benzylidene phenones. Moreover, all of these known classes of polymers contain aromatic rings and are, therefore, less stable to prolonged exposure to light than the norbornenyl-containing systems, which have enhanced light stability. Other advantages of the norbornenyl-containing polymers are improved economics and greater versatility in preparing a broad spectrum of polymer types.

The norbornenyl-containing radiation convertible polymers also have important and unexpected advantages over heretofore used conventional polymers containing added curing promoters (e.g., allyl cyanamate, allyl acrylate). Among these advantages are the fact that lower doses of radiation are required to achieve high levels of crosslinking and that no residual additives remain after curing to contaminate the polymer.

Moreover, radiation curing of the norbornenyl-containing polymers is particularly advantageous in comparison to non-radiative methods of curing (e.g., thermal, peroxides, protonic acids, Lewis acids, etc.). This is because radiation curing can be run at low temperatures and under generally mild conditions; with no additives, which may later act as contaminants; with on-off control, which allows greater control over the degree of crosslinking; and at great processing speeds, thereby offering higher productivity and improved economics.

BACKBONE RADIATION CONVERTIBLE

Radiation convertible polymers in which the norbornenyl group is in the polymer backbone can be produced directly or indirectly. This class of radiation convertible polymers contains the following divalent norbornenyl structures:

in the polymer backbone and includes, among others, polyesters, polyamides, polyethers, polyureas, polyurethanes, polylactones and the like. For the purposes of this invention such polymers will be known by the term "backbone radiation convertible polymers" or variants thereof. The norbornenyl group can be substituted with up to 2 lower alkyl groups having from 1 to 3 carbon atoms. For purposes of description the specification does not show these alkyl-substituted norbornenes, however, they are included within the scope of the invention.

BACKBONE RADIATION CONVERTIBLE POLYESTER POLYMERS

The backbone radiation convertible polyester polymers can be produced directly by means of known reactions using a norbornene dicarboxylic acid, ester, ester chloride or ester dichloride of the formula:

(I)
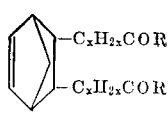

or a dihydroxyl norbornene of the formula:

(II)
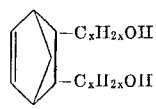

or a norbornene hydroxyl acid, ester or ester chloride of the formula:

(III)
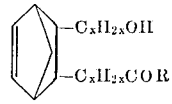

in which $x$ is an integer having a value of from 0 to about 5 and R is hydroxyl or alkoxyl of from 1 to about 3 carbon atoms or chlorine.

Polyesters can be produced by the self-condensation of the norbornene hydroxyl acids (III), alone or with other hydroxyl acid compounds. Polyesters can also be produced by the condensation of a mixture of the norbornene dicarboxylic acid compounds (I) with dihydroxyl norbornenes (II). In addition the polyesters can be produced by the reaction of the norbornene dicarboxylic acid compounds (I) with other aliphatic diols, alone or in admixture with other known dicarboxylic acids or esters. Further, the polyesters can be produced by the reaction of the dihydroxyl norbornenes (II) with other known dicarboxylic acids, either alone or in admixture with other known aliphatic diols. These procedures are known in the art.

In a typical method for the production of polyesters, the calculated amounts of carboxylic acid compounds, hydroxyl compounds and catalyst are charged to a reactor and heated in an inert atmosphere at a temperature below the decomposition temperature of the initial reactants. This is preferably from about 150° C. to about 250° C. It is conventional to use an excess of the least expensive compound, which excess can readily be determined since the reaction between the hydroxyl group and the carboxyl group proceeds in a stoichiometric ratio to form the ester group. If desired the pressure can be reduced to remove low boiling components and to complete the polycondensation reaction. The total esterification time is known to vary since it is dependent upon such variables as the catalyst, starting monomers, pressure, temperature, size of batch, etc. The catalyst is generally present at a concentration of from about 0.001 percent to about 1 percent, preferably from about 0.005 percent to about 0.3 percent, based on the weight of the carboxylic acids charged. Among the known polyesterification catalysts one can mention antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanium silicate, and the like.

Illustrative of conventional diols useful for the production of the backbone radiation convertible polyesters are the aliphatic diols represented by the general formula $HOC_nH_{2n}OH$ in which $n$ is an integer of from 2 to about 10, such as ethylene glycol, trimethylene glycol, pentamethylene glycol, hexamethylene glycol, decamethylene glycol, and the like. Also suitable are 1,4-cyclohexanedimethanol, p-xylyene glycol, hydroquinone diacetate, 4-hydroxybenzyl alcohol, and the like. It is known that any diol of an aliphatic nature, whether or not it contains aromatic nuclei can be used in the production of polyesters. Thus, the term aliphatic diols includes all those diols of an aliphatic nature which are known in the art to be suitable.

The use of the norbornenyl acid chlorides in producing polyesters is advantageous since lower temperatures can be used in the condensation reaction. Thus, polyesters can be produced by the condensation of a norbornene dicarboxylic acid chloride (I) with dihydroxyl norbornenes (II). In addition the polyesters can be produced by the reaction of the norbornene dicarboxylic acid chloride (I) with other aliphatic diols, alone or in admixture with other known dicarboxylic acid chlorides. Further, the polyesters can be produced by the reaction of the dihydroxyl norbornenes (II) with other known dicarboxylic acid chlorides, either alone or in admixture with other known aliphatic diols.

A typical method for the production of polyesters from dicarboxylic acid chlorides and hydroxyl compounds combines approximately equivalent quantities of each in a reaction medium or solvent containing an acid-binding agent. The esterification is accomplished by heating the mixture to an elevated temperature. Since the reaction takes place under very mild conditions especially high temperatures are not necessary, 65–150° C., for example, being the preferred range of reaction temperatures.

The reaction medium may be a diluent or solvent, it is preferable that at least the starting materials be dissolved at the reaction temperature. Suitable as a reaction medium or solvent are aliphatic and aromatic hydrocarbons such as, cyclohexane, heptane, benzene, toluene, tetrahydronaphthalene or cumene, halogenated hydrocarbons such as, chloroform, tetrachloroethylene, monochlorobenzene, orthodichlorobenzene, trichlorobenzene, ethers such as diphenyl ether, diisopropyl ether, N,N-dialkyl amides such as dimethyl formamide, dimethyl acetamide and alkyl sulfoxides such as dimethyl sulfoxide and tetramethylene sulfoxide. The N,N-dialkyl amides are preferred owing to their catalytic effect and favorable solvent power.

As acid binding agents, there are suitable, for example, pyridine and its homologues, furthermore N,N-dialkyl anilines, especially diethyl aniline, isoquinoline and other stable heterocyclic nitrogen bases. Aliphatic or cycloaliphatic tertiary amines can also be used, for example, triethylamine, triethylene diamine, N-methylpiperidine and N-butylpyrrolidine. Also non-basic hydrogen halide acceptors may be used such as acrylonitrile and acylethyleneimides, especially alkyl or arylsulfethyleneimide.

The conventional carboxylic acids useful for the production of the radiation convertible polyesters are well known to those skilled in the art. The most widely used is terephthalic acid and the dialkyl esters thereof, such as dimethyl terephthalate, in which the alkyl group contains from 1 to about 5 carbon atoms. Other known dicarboxylic acids or their esters include isophthalic acid, p,p' - diphenylcarboxylic acid, p,p' - dicarboxydiphenyl ethane, p,p'-dicarboxydiphenyl hexane, p,p'-dicarboxydiphenyl sulfide, p,p'-dicarboxydiphenyl ether, p,p'-dicarboxyphenoxy butane, 2,6-dinaphthalene dicarboxylic acid, and the like. These aromatic acids can be used alone or in admixture, and up to about 20 percent by weight of the aromatic acid can be replaced by an aliphatic dicarboxylic acid or ester thereof, such as adipic acid, succinic acid, sebacic acid, dimethyl 1,20-eicosane dioate, and the like.

Illustrative of known hydroxy acids that can be used in the production of the radiation convertible polyesters one can mention 4-hydroxybenzoic acid, 4-hydroxybutyric acid, 10 - hydroxydecanoic acid, 3 - hydroxy - 2,2-dimethylpropionic acid, as well as the esters thereof, for example, 2,2 - dimethyl-3-hydroxypropyl 2,2-dimethyl-3-hydroxypropionate.

Suitable norbornene compounds for the production of the radiation convertible polyesters include 5,6-dicarboxybicyclo[2.2.1]hept-2-ene; the dimethyl, diethyl, dipropyl, diisopropyl, dibutyl, diisobutyl, ditertiarybutyl, and dipentyl esters of 5,6-dicarboxybicyclo[2.2.1]hept-2-ene; the dicarboxyalkylbicyclo[2.2.1]hept-2-enes such as 5,6-dicarboxymethylbicyclo[2.2.1]hept-2-ene, 5,6-di - (2-carboxyethyl)bicyclo[2.2.1]hept-2-ene, 5,6-di-(3-carboxypropyl)bicyclo[2.2.1]hept-2-ene, 5,6-di-(2-carboxypropyl)bicyclo[2.2.1]hept-2-ene, 5,6-dicarboxybutylbicyclo[2.2.1]hept-t-enes, 5-carboxyethyl-6-carboxypropylbicyclo[2.2.1]hept-2-ene, 5 - carboxymethyl - 6 - carboxypentylbicyclo[2.2.1]hept-2-ene, 5 - carboxy - 6 - carboxymethylbicyclo[2.2.1]hept-2-ene, the 5,6-dicarboxypentylbicyclo[2.2.1]hept-2-enes, 5,6-di(carboxy - 2-ethylhexyl)bicyclo[2.2.1]hept-2-ene, the 5,6-dicarboxydecylbicyclo[2.2.1]hept-2-enes; the alkyl esters of said 5,6 dicarboxyalkylbicyclo[2.2.1]hept-2 - enes; 5,6 - dihydroxybicyclo[2.2.1]hept-2-ene; the lower fatty acid esters such as the acetoxy, propionoxy, butyryloxy, pentanoyloxy esters of 5,6-dihydroxybicyclo[2.2.1]hept-2-ene; the 5,6-dihydroxyalkylbicyclo[2.2.1]hept-2-enes such as 5,6-dihydroxymethylbicyclo[2.2.1]hept - 2 - ene, 5,5-dihydroxymethylbicyclo[2.2.1]hept-2-ene, 5,6-di - (2-hydroxyethyl)bicyclo[2.2.1]hept-2-ene, 5-hydroxy-6-hydroxyethylbicyclo[2.2.1]hept-2-ene, 5-hydroxymethyl - 6 - hydroxybutylbicyclo[2.2.1]hept-2-ene, the 5,6-dihydroxypropylbicyclo[2.2.1]hept-2-enes, the 5,6-dihydroxypentylbicyclo[2.2.1]hept-2-enes, the 5,6-didihydroxybutylbicyclo[2.2.1]hept-2-enes, the 5,6-dihydroxyisopropylbicyclo[2.2.1]hept-2-enes; the lower fatty acid esters of said 5,6-dihydroxyalkylbicyclo[2.2.1]hept-2-enes; 5 - hydroxy - 6 - carboxybicyclo[2.2.1]hept-2-ene; the lower mono- and di-esters of said 5-hydroxy-6-carboxybicyclo[2.2.1]hept-2-ene such as 5-carboxy-6-acetoxybicyclo[2.2.1]hept-2-ene, 5 - carboxy - 6 - propionoxybicyclo[2.2.1]hept-2-ene, 5 - carboxy - 6 - butyryloxybicyclo[2.2.1]hept-2-ene, 5 - acetoxy - 6 - carbomethoxybicyclo[2.2.1]hept-2-ene, 5-acetoxy - 6 - carbopentoxybicyclo[2.2.1]hept-2-ene, 5 - pentanoyloxy - 6 - carbomethoxybicyclo[2.2.1]hept-2-ene, 4 - butyryloxy - 6 - carbopropoxybicyclo[2.2.1]hept-2-ene, 5 - hydroxy - 6 - carbomethoxybicyclo[2.2.1]hept-2-ene, 5 - hydroxy - 6 - carbopropoxybicyclo[2.2.1]hept-2-ene, 5 - hydroxy - 6 - carbopentoxybicyclo[2.2.1]hept-2-ene; the 5 - hydroxyalkyl-6-carboxylkylbicyclo[2.2.1]hept-2-enes such as 5-hydroxymethyl-6-carboxymethylbicyclo[2.2.1]hept-2-ene, 5 - hydroxymethyl - 6 - carboxypentylbicyclo[2.2.1]hept-2-ene, 5 - hydroxypentyl - 6 - carboxypentylbicyclo[2.2.1]hept-2-ene, 5 - hydroxypropyl - 6 - carboxypropylbicyclo[2.2.1]hept-2-ene; the lower mono- and di-esters of said 5-hydroxyalkyl - 6 - carboxyalkylbicyclo[2.2.1]hept - 2 - enes such as 5 - acetoxymethyl - 6 - carboxymethylbicyclo[2.2.1]hept-2-ene, 5 - butyryloxymethyl - 6 - carboxyethylbicyclo[2.2.1]hept-2-ene, 5 - acetoxypropyl - 6 - carboxypropylbicyclo[2.2.1]hept-2-ene, 5 - acetoxymethyl-6-carbomethoxymethylbicyclo[2.2.1]hept-2 - ene, 5-propionoxyethyl - 6 - carbomethoxyethylbicyclo[2.2.1]hept-2-ene, 5 - acetoxypentyl - 6 - carbobutoxypropylbicyclo[2.2.1]hept-2-ene, 5 - hydroxymethyl - 6 - carbomethoxymethylbicyclo[2.2.1]hept-2-ene, 5 - hydroxypropyl-6-carbomethoxymethylbicyclo[2.2.1]hept-2-ene, 5 - hydroxypentyl - 6 - carbopropoxypropylbicyclo[2.2.1]hept-2-ene, 5 - hydroxyethyl - 6 - carbobutoxymethylbicyclo[2.2.1]hept-2-ene, 5 - hydroxyethyl - 6 - carbomethoxypentylbicyclo[2.2.1]hept-2-ene; and the like.

These compounds are readily produced by the Diels-Alder reaction of cyclopentadiene with the appropriate ethylenically unsaturated compound as disclosed in U.S. Pat. No. 2,340,908.

In the production of the radiation convertible polyesters, the norbornene compound defined by Formulas I, II and III can be the sole reactant of that particular class necessary for the production of the polyester or it can be any lesser amount. Preferably, however, the norbornene compound is used at a concentration of about 5 mole percent or more of the radiation convertible polyester produced and preferably from about 10 mole percent to about 50 mole percent of the polyester. It has been observed that crosslinking occurs at a more rapid rate as the concentration of the norbornenyl compound is increased since the number of crosslinking sites is correspondingly higher. As is obvious to those skilled in the art, the maximum, theoretical mole percent possible when one is using a dicarboxylic acid compound of Formula I is 50 mole percent since an equal molar quantity of diol is necessary to react with the norbornenyl dicarboxylic acid or ester; the same maximum applies when one is using a dihydroxyl norbornene of Formula II since an equal molar quantity of dicarboxylic acid or ester is necessary to react with the dihydroxyl norbornene compounds. However, since the norbornene hydroxyl acids of Formula III can self-condense, such compounds can be used at a molar concentration of 100 percent.

Illustrative examples of backbone polyester radiation convertible polymers are the polyesters produced from the following combinations of reactants. The figures in the parenthesis represent the mole percent of that particular compound charged when a mixture of that class of compound was used, this mole percent is based on the total molar amount of that class of compound involved, whether it be dicarboxylic acid compounds, dihydric compounds, or hydroxyl acid compounds.

(1) 5,6-dicarboxybicyclo[2.2.1]hept-2-ene
    ethylene glycol
(2) 5,6-dicarboxybicyclo[2.2.1]hept-2-ene (40)
    dimethylterephthalate (60)
    ethylene glycol
(3) dimethylester of 5,6-dicarboxybicyclo[2.2.1]hept-2-ene (50)
    dimethylterephthalate (50)
    ethylene glycol
(4) 5,6-dicarboxymethylbicyclo[2.2.1]hept-2-ene (20)
    dimethylterephthalate (80)
    ethylene glycol
(5) diethylester of 5,6-dicarboxymethylbicyclo[2.2.1]hept-2-ene (30)
    dimethylterephthalate (70)
    ethylene glycol
(6) 5,6-dihydroxybicyclo[2.2.1]hept-2-ene
    dimethylterephthalate
(7) 5,6-diacetoxybicyclo[2.2.1]hept-2-ene
    isophthalic acid
(8) 5,6-dihydroxybicyclo[2.2.1]hept-2-ene
    terephthalic acid (90)
    p,p'-diphenylcarboxylic acid (10)
(9) 5,6-dihydroxybicyclo[2.2.1]hept-2-ene (25)
    ethylene glycol (75)
    dimethylterephthalate
(10) 5,6-dihydroxymethylbicyclo[2.2.1]hept-2-ene (30)
    ethylene glycol (70)
    dimethylterephthalate
(11) 5,6-diacetoxymethylbicyclo[2.2.1]hept-2-ene (10)
    ethylene glycol (90)
    dimethylterephthalate
(12) 5-hydroxy-6-carboxybicyclo[2.2.1]hept-2-ene
(13) 5-hydroxy-6-carboxybicyclo[2.2.1]hept-2-ene (20)
    3-hydroxypropionic acid (80)
(14) 5-carboxy-6-acetoxybicyclo[2.2.1]hept-2-ene (10)
    7-hydroxypentanoic acid (90)
(15) 5-acetoxy-6-carbomethoxybicyclo[2.2.1]hept-2-ene (50)
    p-hydroxybenzoic acid (50)
(16) 5-hydroxy-6-carbomethoxybicyclo[2.2.1]hept-2-ene (40)
    6-hydroxyhexanoic acid (60)
(17) 5-hydroxymethyl-6-carboxymethylbicyclo[2.2.1]hept-2-ene (50)
    6-hydroxyhexanoic acid (50)
(18) 5-acetoxymethyl-6-carboxymethylbicyclo[2.2.1]hept-2-ene (50)
    6-hydroxyhexanoic acid (50)
(19) 5-acetoxymethyl-6-carbomethoxymethylbicyclo[2.2.1]hept-2-ene (50)
    7-hydroxypentanoic acid (60)
(20) 5-hydroxymethyl-6-carbomethoxymethylbicyclo[2.2.1]hept-2-ene (50)
    7-hydroxypentanoic acid (50)
(21) 5,6-dicarboxybicyclo[2.2.1]hept-2-ene
    5,6-dihydroxybicyclo[2.2.1]hept-2-ene
(22) 5,6-dicarboxymethylbicyclo[2.2.1]hept-2-ene
    5,6-dihydroxybicyclo[2.2.1]hept-2-ene
(23) dimethylester of 5,6-dicarboxyethylbicyclo[2.2.1]hept-2-ene
    5,6-dihydroxybicyclo[2.2.1]hept-2-ene
(24) 5-hydroxy-6-carboxybicyclo[2.2.1]hept-2-ene
    5-hydroxy-6-carbopropoxybicyclo[2.2.1]hept-2-ene The backbone radiation convertible polyesters can range from low average molecular weight polymers of about 750 to high average molecular weights up to about 100,000 or higher.

BACKBONE RADIATION CONVERTIBLE POLYAMIDE POLYMERS

The backbone radiation convertible polyamide polymers are produced directly by means of known reactions using a norbornene dicarboxylic acid compound of Formula I, or a diamino norbornene of the formula:

(IV) 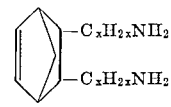

or a norbornene amino acid of the formula (V) 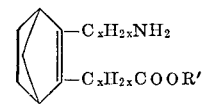

in which R' is hydrogen or alkyl of from 1 to about 3 carbon atoms.

Radiation convertible polyamides can be produced by the self-condensation of the norbornene amino acids (V), alone or with other amino acid compounds. The polyamides can also be produced by the condensation of a mixture of the norbornene dicarboxylic acid compounds (I) with diamino norbornenes (IV) or with other known diamino compounds known to be useful in the production of polyamides. Further, the polyamides can be produced by the reaction of the diamino norbornenes (IV) with other known dicarboxylic acids, either alone or in admixture with other known diamines.

The production of polyamides is well known to those skilled in the art, as is the calculation of the proportions of the reactants to be charged. The selected reactants are generally heated at reduced pressure under an inert gas atmosphere while removing water of condensation; catalysts are used to increase the rate of reaction. The temperature of the reaction is kept below the decomposition temperature of the initial reactants.

The backbone radiation convertible polyamide polymers may also be produced by a heterogeneous or interfacial polymerization process whereby a polyamine is caused to react with a dicarboxylic acid chloride in a system in which the reactants are in solution in mutually immiscible solvents and the solution of one of the reactants is dispersed in the solution of the other. This process may be carried out either as a batch process or as a continuous process, and is clearly described in British specification 737,184, which is hereby incorporated by reference. This patent also discloses many suitable amine compounds.

The preferred conventional dicarboxylic acids that can be used are the alpha, omega alkanedioic acids containing from about 6 to about 20 carbon atoms such as hexanedioic acid, octanedioic acid, nonanedioic acid, henedecanedioic acid, dodecanedioic acid, hexadecanedioic acid, eicosanedioic acid, and the like.

The known conventional diamines include 1,6-hexanediamine, 1,8-octanediamine, 1,9-nonanediamine, 1,12-dodecanediamine, 1,14-tetradecanediamine, and the like.

Suitable known amino acids include 6-aminohexanoic acid, 7-aminoheptanoic acid, 10-aminodecanoic acid, 15-aminopentadecanoic acid, and the like.

The radiation convertible polyamide polymers can also be produced by reacting the norbornene compounds (V)

with caprolactams such as epsilson-caprolactam, the methylepsilon-caprolactams, and the like.

Suitable norbornene compounds for the production of the radiation convertible polyamides include the norbornene dicarboxylic acids and acid halides within the scope of Formula I that have been named supra; 5,6-diaminobicyclo[2.2.1]hept-2-ene; the 5,6-di(aminoalkyl)-bicyclo[2.2.1]hept - 2 - enes such as 5 - amino-6-aminomethylbicyclo[2.2.1]hept - 2 - ene, 5,6-di(aminomethyl)-bicyclo[2.2.1]hept - 2 - ene, 5,6-di(aminopropyl)bicyclo-[2.2.1]hept - 2 - ene, 5-aminoethyl-6-aminobutylbicyclo-[2.2.1]hept-2-ene; the 5-amino-6-carboxybicyclo[2.2.1]hept-2-enes such as 5-amino-6-carboxybicyclo[2.2.1]hept-2-ene, 5-aminomethyl-6-carboxybicyclo[2.2.1]hept-2-ene, 5 - aminopentyl - 6 - carboxybicyclo[2.2.1]hept-2-ene, 5-amino-6-carboxymethylbicyclo[2.2.1]hept-2-ene, 5-amino-6-carboxypropylbicyclo[2.2.1]hept-2-ene; the acid chlorides of said 5-amino-6-carboxybicyclo[2.2.1]hept-2-ene compounds; and the like.

The concentration of norbornene compound used in producing the radiation convertible polyamide can vary from about 5 mole percent to 100 mole percent. When one is using either a norbornene dicarboxylic acid of Formula I or a norbornene diamino compound of the Formula IV the theoretical maximum mole percent of each charged is 50 mole percent, whereas one can use up to 100 mole percent of a norbornene amino acid of Formula V, these mole ratios are based on the total moles of reactants charged.

Illustrative radiation convertible polyamides are the polymers produced from the following combinations of reactants. The parenthetical figure is the mole percent of that particular compound charged when a mixture of that class of compound is used, this mole percent is based on the total molar amount of that class of compound involved, whether it be dicarboxylic acid compound, diamino compound, or amino acid compound.

(25) 5,6-dicarboxybicyclo[2.2.1]hept-2-ene
1,6-hexanediamine
(26) 5,6-dicarboxybicyclo[2.2.1]hept-2-ene (50)
1,6-hexanedioic acid (50)
1,6-hexanediamine
(27) 5,6-dicarboxybicyclo[2.2.1]hept-2-ene (50)
1,6-hexanedioic acid (50)
5,6-diaminobicyclo[2.2.1]hept-2-ene (50)
1,6-hexanediamine (50)
(28) 5,6-dicarboxyethylbicyclo[2.2.1]hept-2-ene
1,12-dodecanediamine (50)
5,6-diaminoethylbicyclo[2.2.1]hept-2-ene (50)
(29) diacid chloride of 5,6-dicarboxymethylbicyclo-[2.2.1]hept-2-ene
1,10-decanediamine
(30) 5,6-diaminopropylbicyclo[2.2.1]hept-2-ene (25)
1,8-octanediamine (75)
1,6-hexanedioic acid
(31) 5-amino-6-carboxybicyclo[2.2.1]hept-2-ene
(32) 5-amino-6-carboxybicyclo[2.2.1]hept-2-ene
1-aminodecanoic acid
(33) 5-aminomethyl-6-carboxybicyclo[2.2.1]hept-2-ene
epsilon-caprolactone
(34) 5-amino-6-carboxyethylbicyclo[2.2.1]hept-2-ene
6-aminohexanoic acid
(35) 5,6-dicarboxybicyclo[2.2.1]hept-2-ene
epsilon-caprolactam The molecular weight of the polyamides can be controlled by known procedures and can vary from about 750 to about 100,000 or more.

BACKBONE RADIATION CONVERTIBLE POLYETHER POLYMERS

The backbone radiation convertible polyethers can be readily produced by the catalytic reaction of an oxirane compound such as ethylene oxide, 1,2-propylene oxide, 1,2-butylene oxide, 2,3-butylene oxide, styrene oxide or mixtures thereof with any of those norbornene compounds defined by Formulas I to V inclusive which have a reactive hydrogen atom. The polyether adducts can have molecular weights of from about 200 to about 10,000, preferably from about 750 to about 5,000. It is known that the molecular weight of such adducts can be controlled by controlling the amount of oxirane compound added.

In an embodiment for the production of the radiation convertible polyethers, one mole of 5,6-dihydroxymethyl-bicyclo-hept-2-ene and 0.1 mole of powdered potassium hydroxide are placed in an autoclave, which is sealed, purged with nitrogen and heated. Then from about 20 to 200 moles, or more, of alkylene oxide are fed to the autoclave at a rate to maintain a temperature of about 100° C. to 120° C. At the completion of the oxide feed, the autoclave temperature is maintained at about 100° C. until constant pressure is achieved to complete the reaction. The crude product is neutralized, refined with calcium, magnesium or aluminum silicate, and filtered.

Illustrative of backbone radiation convertible polyethers are the polyethers produced from the following combination of reactants. In this instance the parenthetical figure represents the moles of alkylene oxide compound charged.

(36) 5,6-dicarboxybicyclo[2.2.1]hept-2-ene
ethylene oxide (20)
(37) 5,6-dicarboxymethylbicyclo[2.2.1]hept-2-ene
ethylene oxide (20)
propylene oxide (30)
(38) 5,6-dihydroxybicyclo[2.2.1]hept-2-ene
ethylene oxide (100)
(39) 5,6-dihydroxyethylbicyclo[2.2.1]hept-2-ene
ethylene oxide (50)
styrene oxide (10)
(40) 5-hydroxy-6-carboxybicyclo[2.2.1]hept-2-ene
ethylene oxide (90)
1,2-butylene oxide (10)
(41) 5 - hydroxymethyl - 6 - carboxyethylbicyclo[2.2.1] hept-2-ene
ethylene oxide (150)
(42) 5,6-diaminobicyclo[2.2.1]hept-2-ene
ethylene oxide (150)
propylene oxide (50)
(43) 5,6-diaminomethylbicyclo[2.2.1]hept-2-ene
propylene oxide (75)
(44) 5-amino-6-carboxybicyclo[2.2.1]hept-2-ene
ethylene oxide (40)
propylene oxide (40)
(45) 5-aminoethyl-6-carboxybicyclo[2.2.1]hept-2-ene
ethylene oxide (50)
(46) 5-amino-6-carboxypropylbicyclo[2.2.1]hept-2-ene
ethylene oxide (20)

The backbone radiation-convertible polyethers can also be readily produced by the copolymerization of an oxacyclo compound such as ethylene oxide, 1,2-propylene oxide, 1,2-butylene oxide, 2,3-butylene oxide, styrene oxide, cyclohexene oxide, 3,3-bis-(chloromethyl)oxacyclobutane, 3,3 - bis(methyl)oxacyclobutane, 3,3 - bis(fluoromethyl)-oxacyclobutane, tetrahydrofuran, 7-oxabicyclo[2.2.1]heptane or mixtures thereof with a norbornene oxacyclo compound of Formula VI (VI)

where $y$ is 0 or 1, or Formula VII (VII)

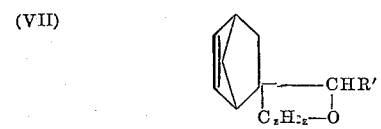

where $z$ is 0 to 2 and R' is hydrogen or alkyl of 1 to 3 carbon atoms. The polyether polymers can have molecular weights of from about 200 to about 100,000 or higher, preferably from about 750 to 50,000.

In the production of polyethers, the desired amounts of liquid organic reaction medium, monomers and catalyst are charged to a polymerization vessel in an inert atmosphere and maintained at a temperature of from −110° C. to about 200° C., preferably from about −30° C. to 100° C. until the polymerization reaction is complete. The product is recovered by evaporation of solvent, filtration or precipitation with a nonsolvent and filtration. The crude product is washed with nonsolvent to remove catalyst residues, unreacted monomer and residual solvent and then dried.

The liquid organic reaction medium may be a solvent or a nonsolvent for the monomers, which is inert to the monomers and to the catalyst, and which remains liquid under the conditions used in the polymerization. Usefully employable media are the ethers, such as diethyl ether and dimethyl ether, aromatic hydrocarbons, such as benzene, toluene and xylene, chlorinated hydrocarbons such as methylene chloride, aliphatic hydrocarbons, and cycloaliphatic hydrocarbons. The preferred reaction media are the hydrocarbons and chlorinated hydrocarbons containing 1 to 10 carbon atoms in the molecule.

The amount of reaction medium is not critical and is determined only by preference. The amount of reaction medium may be very small or negligible compared to the final polymer which is formed in which case the product mixture is solid or very thick and difficult to handle, and on the other hand the employment of very large amounts of reaction medium compared to the polymer which is formed makes recovery of the polymeric product difficult. Generally from 0 to 1000 parts of reaction medium per part of polymer formed are employed, preferably from 4 to 100 parts of reaction medium are used.

The catalyst is generally present at a concentration of from 0.0001 percent to about 10 percent, preferably from about .005 to 0.5 percent based on the weight of monomers charged. Such catalyst include a wide variety of compounds and illustrative thereof one can mention for example: (a) strong bases such as the alkali and alkaline earth metal oxides, hydroxides, alkoxides, phenoxides, amides, amide-alkoxide and hexammoniate; (b) alcoholates and phenolates of various metals such as Fe(OR″)$_3$, Ti(OR″)$_4$, Sn(OR″)$_4$, Sn(OR″)$_2$, Al(OR″)$_3$, and the like, wherein R″ is alkyl or aryl, and the reaction products of alcoholates with water, carboxylic acids, metal salts, beta-diketones, and 2-(N,N-dialkylamino)alkanols, such as the well-known chelates of titanium obtained by said or equivalent procedures; (c) salts of organic acids with a variety of metals such as alkali metals, alkaline earth metals, Al, Sn, Pb, Mn, Co, Ni and Cu, including for example, sodium acetate, calcium oxalate, stannous oxalate, stannous octoate, stannous laurate, lead octoate, metallic driers such as manganese and cobalt naphthenate, and the like; (d) organimetallic derivatives of the metals of Groups I, II and III of the Periodic Table such as butyl lithium, tributyl boron, triethyl aluminum, diethyl aluminum chloride, dibutyl aluminum ethoxide, diphenyl aluminum hydride, dibutyl zinc, diisobutyl cadmium, reaction products of these compounds with water, alcohols, metal halides, metal oxides, chelating agents such as acetylacetone, benzoylacetone, diethylmalonate and chelated compounds containing a transition metals; (e) Lewis acids such as boron trifluoride, phosphorous pentafluoride, sulful trioxide, aluminum chloride, ferric chloride, stannic chloride, antimony pentachloride and the like; (f) oxonium salts such as triethyloxonium borofluoride, triethyloxonium tetrachloroferrate, triethyloxonium hexachloroantimoniate, and the like.

The best results from the standpoint of polymer yield are obtained when the polymerization is effected under anhydrous, non-oxidizing conditions. A convenient way for obtaining such conditions is by sweeping the system with a dry, inert gas and polymerizing under a blanket of inert gas. A suitable inert gas is nitrogen.

Illustrative of radiation-convertible polyethers are the polymers produced from the following reactant combinations. In this group of examples the parenthetical figure represents the parts by weight of that particular reactant.

(47) propylene oxide (100)
3-oxatricyclo [3.2.1.0$^{2,4}$]oct-6-ene (20)
dibutyl zinc (1)
(48) 3,3-bis(chloromethyl)oxacyclobutane (5)
spiro[(bicyclo[2.2.1]hept-2-ene)-6,3'-(1-oxacyclobutane)] (5)
methyl chloride (100)
phosphorus pentafluoride (0.1)
(49) 3-oxatricyclo[4.2.1.0$^{2,5}$]non-7-ene (10)
toluene (50)
diethyl zinc (.08), water (.01)
(50) tetrahydrofuran (100)
4-oxatricyclo[5.2.1.0$^{2,6}$]dec-8-ene (20)
triethyloxonium hexachloroantimoniate (1)
(51) cyclohexene oxide (10)
3-oxatricyclo[3.2.1.0$^{2,4}$]oct-6-ene (3)
toluene (20)
triethyl aluminum (.1), water (.02)

BACKBONE RADIATION CONVERTIBLE URETHANE POLYMERS

The backbone radiation convertible urethane polymers can be produced by known reactions; these polymers can be elastomers when produced in the absence of a blowing agent or cellular when produced using any of the known blowing agents.

The conventional organic polyisocyanates that can be used to produce the urethane polymers include the isocyanates such as ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, polymethylene polyphenyleneisocyanates, the 2,4- and 2,6-tolylene diisocyanates, the 1,3- and 1,4-xylene diisocyanates, bis(4-isocyanatophenyl)methane, 4,4'-diphenylpropane diisocyanates, the polyisocyanates disclosed in U.S. Pat. 2,683,730, bis(2-isocyanatoethyl)carbonate and the like. The norbornene isocyanates are those compounds of the formulas:

(VIII)

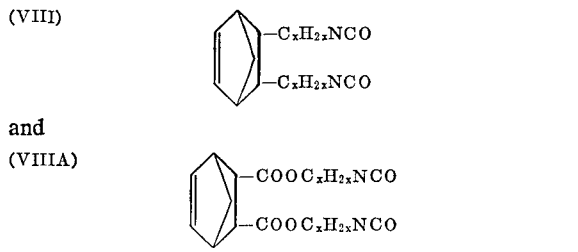

and
(VIIIA)

and include 5,6-bicyclo[2.2.1]hept-2-ene diisocyanate, 5,6 - diisocyanatomethylbicyclo[2.2.1]hept-2-ene, 5,6-diisocyanatobutylbicyclo[2.2.1]hept - 2 - ene, bis(2-isocyanatoethyl)bicyclo[2.2.1]hept-5-en-2,3-dicarboxylate, 5,6-diisocyanatopentylbicyclo[2.2.1]hept-2-ene, and the like as disclosed in U.S. 3,275,679. The isocyanates can be used alone or in combination.

The polyisocyanates described supra react with compounds containing a reactive hydrogen atom as determined by the Zerewitinoff method to produce urethane polymers. The norbornene isocyanates of Formulas VIII and VIIIA can react with the previously described radiation convertible polyester polymers and radiation convertible polyether polymers to produce radiation convertible urethane polymers. Radiation convertible urethane polymers are also produced by the reaction of norbornene isocyanates of Formulas VIII and VIIIA with the known polyether polyols and polyester polyols. Further, radiation convertible urethane polymers can also be produced by the reaction of the previously described radiation convertible polyester polymers and radiation convertible polyether polymers with the known conventional organic polyisocyanates. All of these procedures introduce the radiation convertible norbornenyl group into the polymer backbone.

Other methods can also be used for producing radiation convertible urethane polymers containing the norbornene group in the polymer backbone. Thus for instance fumaryl diisocyanate can be reacted with a conventional polyol to produce an unsaturated urethane polymer that is subsequently reacted with a cyclopentadiene, as follows:

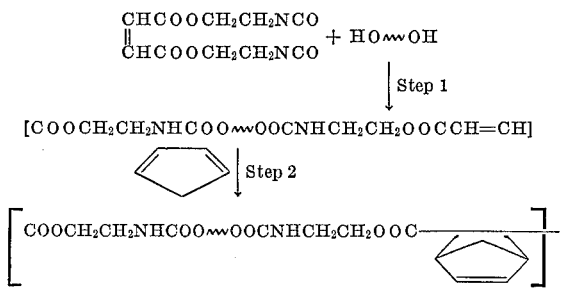

The conventional polyols suitable for use in producing the radiation convertible urethane polymers, either (1) by reaction alone with a norbornene isocyanate of Formulas VIII or VIIIA or (2) by reaction with a mixture of isocyanates including at least one norbornene isocyanate of Formulas VIII or VIIIA or (3) in admixture with a radiation convertible polyester polymer or radiation convertible polyether polymer can be a hydroxyl-terminated polyester, a polyhydroxyalkane, a polyphenol, a polyoxyalkylene polyol, or the like, having a molecular weight of at least about 200. Among the polyols which can be employed one can include, among others, one or more polyols from the following classes of compositions (minor amounts of polyhydroxyalkanes can be present):

(a) Hydroxyl-terminated polyesters;
(b) Alkylene oxide adducts of polyhydroxyalkanes;
(c) Trialkanolamines and alkylene oxide adducts thereof;
(d) Acohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde condensation products;
(g) Alkylene oxide adducts of phosphorus and polyphosus acids;
(h) Polyphenols and alkylene oxide adducts thereof;
(i) Polytetramethylene glycols;
(j) Glycerides, such as castor oil and the halogenated derivates thereof; and the like.

Illustrative hydroxyl-terminated polyesters are those which are prepared by polymerizing a lactone in the presence of an active hydrogen-containing starter as disclosed in U.S. Pat. No. 2,914,556.

Illustrative alkylene oxide adducts of polyhydroxyalkanes include, among others, those alkylene adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like, having a molecular weight of at least 200; preferred are the adducts of ethylene oxide, propylene oxide, the epoxybutanes, or mixtures thereof.

Two particularly preferred classes of alkylene oxide adducts of polyhydroxyalkanes are the ethylene oxide, propylene oxide, butylene oxide, or mixtures thereof, adducts of dihydroxyalkanes and of trihydroxyalkanes. Included are the alkylene oxide adducts of dihydroxyalkanes such as diethylene glycol, triethylene glycol, tetraethylene glycol, dipropylene glycol, tripropylene glycol, tetrapropylene glycol, dibutylene glycol, glycerol, high molecular weight polyoxyethylene glycols, high molecular weight polyoxypropylene glycols, mixed ethylene-propylene glycols, mixed polyoxyethylene-polyoxypropylene glycols, and the like.

Another useful class of polyols which can be employed includes the trialkanolamines and the alkylene oxide adducts thereof. Illustrative trialkanolamines include triethanolamine, triisopropanolamine, and tributanolamine. The alkylene oxide adducts thereof which can be employed are preferably those wherein the oxyalkylene moieties therein have from 2 to 4 carbon atoms.

Another useful class of polyols which can be employed includes the alkylene oxide adducts of mono- and polyamines. The mono- and polyamines are preferably reacted with alkylene oxides that have 2 to 4 carbon atoms, for example, ethylene oxide, 1,2-epoxypropane, the epoxybutanes, and mixtures thereof. Mono- and polyamines suitable for reaction with the alkylene oxides include, among others, methylamine, ethylamine, isopropylamine, butylamine, benzylamine, aniline, the toluidines, the naphthylamines, ethylenediamine, diethylenetriamine, triethylenetetramine, 1,3-butanediamine, 1,3-propanediamine, 1,4-butanediamine, 1,2-, 1,3-, 1,4-, 1,5- and 1,6-hexanediamine, the phenylenediamines, the toluenediamines, the naphthalenediamines, and the like. Among the compounds of the above groups which are of particular interest are, among others N,N,N',N'-tetrakis(2-hydroxyethyl)ethylenediamine, N,N,N',N'-tetrakis(2 - hydroxypropyl)ethylenediamine, N,N,N',N'',N''-pentakis - (2-hydroxypropyl) diethylenetriamine, phenyldiisopropanolamine and higher alkylene oxide adducts of aniline, and the like. Others which deserve particular mention are the alkylene oxide adducts of unsubstituted or substituted aniline/formaldehyde condensation products.

A further class of polyols which can be employed includes the non-reducing sugars, the non-reducing sugar derivates, and more preferably, the alkylene oxide adducts therein wherein the alkylene oxides have from 2 to 4 carbon atoms, for example as disclosed in U.S. 3,073,788. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like.

A still further useful class of polyols includes the polyphenols, and preferably the alkylene oxide adducts thereof wherein the alkylene oxides have from 2 to 4 carbon atoms. Among the polyphenols which are contemplated are found, for example bisphenol A, bisphenol F, condensation products of phenol and formaldehyde, more particularly the Novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols includes the alkylene oxide adducts, preferably the ethylene oxide, 1,2-epoxypropane, epoxybutane, and mixtures thereof, adducts of aromatic amine/phenol/aldehyde condensation products. The condensation products are prepared by condensing an aromatic amine, for instance aniline, toluidine, or the like, a phenol such as phenol, cresol, or the like, and an aldehyde, preferably formaldehyde, at elevated temperatures in the range of, for example, from 60° C. to 180° C. the condensation product is then recovered and reacted with alkylene oxide, using a basic catalyst (e.g. potassium hydroxide) if desired, to produce the polyols. The propylene oxide and mixed propyleneethylene oxide adducts of aniline/phenol/formaldehyde condensation products deserve particular mention.

The alkylene oxide adducts of the phosphorous and polyphosphorous acids constitute another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, the polymetaphosphoric acids, and the like are desirable for use in this connection.

Another useful class of polyols are the polytetramethylene glycols, which are prepared by polymerizing tetrahydrofuran in the presence of an acidic catalyst.

The polyols can have hydroxyl numbers which vary over a wide range. In general, the hydroxyl numbers of the polyols employed can range from about 20, and lower, to about 1000, and higher, preferably, from about 30 to about 600, and more preferably, from about 35 to about 450. The hydroxyl number is defined as the number of milligrams of potassium hydroxide required for the complete hydrolysis of the fully acetylated derivatives prepared from 1 gram of polyol. The hydroxyl number can also be defined by the equation:

$$OH = \frac{56.1 \times 1000 \times f}{M.W.}$$

where:

OH=hydroxyl number of the polyol
$f$=functionality, that is, average number of hydroxyl groups per molecule of polyol
M.W.=molecular weight of the polyol.

The amount of polyisocyanate employed to produce the photosensitive urethane polymer is dependent, in part, upon such factors as the nature of the reactants, the nature of the end-use for the polyurethane product, and the like. In general, however, the total isocyanato equivalent to total reactive hydrogen equivalent (i.e., total equivalent of alcoholic hydroxyl plus water, if water is employed in the formulation) is ordinarily such as to provide enough isocyanato equivalents to react with all reactive hydrogen equivalents present. Preferably, the ratio of isocyanato equivalents to reactive hydrogen equivalents is about 1.0 to 1.1 isocyanato equivalents per reactive hydrogen equivalent.

The photosensitive urethane polymers are prepared in the absence of blowing agent by either the quasi-prepolymer or the prepolymer technique when a non-cellular product is desired. When cellular products are desired, either the one-shot or the quasi-prepolymer technique can be employed. These procedures are well known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about −40° C. and 70° C., which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,3,4,4,4 - nonafluorobutane, hexafluorocyclobutene, and octafluorocyclobutane. Other useful blowing agents include low boiling hydrocarbons such as butane, pentane, hexane, cyclohexane, and the like. Many other compounds easily volatilized by the exotherm of the isocyanate-reactive hydrogen reaction also can be employed as is known in the art, including acetone, and the like. A further class of blowing agents includes the thermally unstable compounds which liberate gases upon heating, such as N,N'-dimethyl-N,N-dinitrosoterephthalamide, ammonium bicarbonate, and the like.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds and illustrative thereof one can mention for example:

(a) Tertiary amines such as trimethylamine, triethylamine, N-methylmorpholine, N-ethylmorpholine, N,N-dimethylbenzylamine, N,N-dimethylethanolamine, N,N,N',N'-tetramethyl-1,3-butanediamine triethanolamine, 1,4-diazabicyclo[2.2.2]octane, and the like.

(b) Tertiary phosphines such as trialkylphosphines, dialkylbenzylphosphines, and the like.

(c) Strong bases such as the alkali and alkaline earth metal hydroxides, alkoxides, and phenoxides.

(d) Acidic metal salts of strong acids such as ferric chloride, stannic chloride, stannous chloride, antimony trichloride, bismuth nitrate and chloride, and the like.

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like.

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)-alkanols, such as the well known chelates of titanium obtained by said or equivalent procedures.

(g) Salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like.

(h) Organometallic derivatives of tetravalent tin, trivalent and pentavalent As, Sb, and Bi, and metal carbonyls of iron and cobalt. As is obvious to those skilled in the art, many other catalysts and solvents that have a catalytic effect can also be used.

Among the organotin compounds that deserve particular mention are dialkyltin salts of carboxylic acids, e.g., dibutyltin diacetate, dibutyltin dilaurate, dibutyltin maleate dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

It is also known to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Pats. 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifier.

Illustrative of photosensitive urethane polymers are the polyurethanes produced from the following reactant combinations. In this group of examples the parenthetical figure represents the percentage by weight based on the total weight of that particular class of reactants. The methods for producing urethane foams and elastomers are well known in the art; reference thereto can be made to Saunders and Frisch, Polurethanes, parts I and II, published by Interscience Publishers.

(52) 5,6-bicyclo[2.2.1]hept-2-ene diisocyanate
1,2-propylene oxide adduct of glycerol to about 3000 average molecular weight and average hydroxyl number of 56 (Polyol A)

(53) 5,6-diisocyanatomethylbicyclo[2.2.1]hept-2-ene (50)
80/20 mixture of 2,4- and 2,6-tolylene diisocyanates (50)
ethylene oxide adduct of glycerol to about 2500 molecular weight capped with 1,2-propylene oxide to a final average molecular weight of about 3000 (Polyol B)

(54) 5,6-diisocyanatomethylbicyclo[2.2.1]hept-2-ene (30)
80/20 mixture of 2,4- and 2,6-tolylene diisocyanates (70)
Photosensitive Polyester No. 1, supra

(55) 5,6-diisocyanatomethylbicyclo[2.2.1]hept-2-ene (30)
80/20 mixture of 2,4- and 2,6-tolylene diisocyanates (70)
Photosensitive Polyether No. 36, supra

(56) 5,6-diisocyanatomethylbicyclo[2.2.1]hept-2-ene (30)
80/20 mixture of 2,4- and 2,6-tolylene diisocyanates (70)
Photosensitive Polyether No. 42, supra

(57) 5,6-diisocyanatomethylbicyclo[2.2.1]hept-2-ene (30)
80/20 mixture of 2,4- and 2,6-tolylene diisocyanates (70)
Polyol A (75)
Photosensitive Polyether No. 37 (25), supra

(58) 5,6-diisocyanatomethylbicyclo[2.2.1]hept-2-ene (50)
80/20 mixture of 2,4- and 2,6-tolylene diisocyanates (50)
Photosensitive Polyether No. 36, supra

(59) 5,6-diisocyanatomethylbicyclo[2.2.1]hept-2-ene (50)
80/20 mixture of 2,4- and 2,6-tolylene diisocyanates (50)
Photosensitive Polyester No. 1, supra

(60) 5,6-diisocyanatomethylbicyclo[2.2.1]hept-2-ene (50)
80/20 mixture of 2,4- and 2,6-tolylene diisocyanates (50)
Photosensitive Polyether No. 36 (20), supra
Polyol B (80)

(61) Polymethylene polyphenylisocyanate
Photosensitive Polyether No. 36, Supra

(62) 80/20 mixture of 2,4- and 2,6-tolylene diisocyanate
Photosensitive Polyether No. 37, supra

(63) 80/20 mixture of 2,4- and 2,6-tolylene diisocyanate
Photosensitive Polyester No. 6, supra

(64) 80/20 mixture of 2,4- and 2,6-tolylene diisocyanate
Polyol A (65)
Photosensitive Polyether No. 36 (35), supra The radiation convertible polyureas may be prepared by the reaction of a diamine norbornene (IV) alone or with other diamines and phosgene. The polyureas can also be produced by reaction of a dicarbamoyl chloride (bischloroformate) and a diamine norbornene (IV) or other diamine compound. The dicarbamoyl chloride can be prepared by reaction of a diamino norbornene (IV) or other diamine compound with an excess of phosgene. The polyureas can be prepared by reaction of a norbornene diisocyanate (VIII or VIIIA) alone or in combination with other diisocyanates and a diamino norbornene alone or in combination with other diamino compounds. Further, the polyureas can be prepared by reaction of a diamino norbornene (IV) with other known diisocyanates, either alone or in admixture with other known diamines.

The polyureas can be produced by solution polymerization at moderate temperatures, this method involves dissolving each complementary reactant, for instance, a diamine and a diisocyanate or a dicarbamoyl chloride in separate portions of the same solvent substantially inert to the reactants, and the mixing of these solutions at a temperature of from 0° C. to 120° C. to form high molecular weight polymer. For this reaction the total number of reactive amine groups should not differ from the total number of isocyanate groups by more than about 5%.

The solvents which may be used in this reaction are any one of those which are inert to the reactants and polymer and will dissolve both reactants at the reaction temperature. Among these may be mentioned acetone, methylene chloride, chloroform, dimethylacetamide, N-methylpyrrolidone, dimethylcyanamide, benzene, nitromethane, chlorobenzene, dimethylsulfoxide, etc. Especially advantageous are solutions of dimethylformamide or dimethylacetamide containing up to about 5% of lithium chloride. In the preferred embodiment, the reaction is preformed at room temperature with the reactants being dissolved in a solvent for the polymer to such an extent that the resulting polymer solution contains at least 5%, but preferably 20% or more, of the polymer and is suitable for the spinning of fibers or casting of films with little or no further concentration.

Illustrative radiation convertible polyureas are the polymers produced from the following combinations of reactants. The parenthetical figure is the mole percent of that particular compound charged when a mixture of that class of compound is used, this mole percent is based on the total molar amount of that class of compound involved, whether it be diamine or diisocyanate.

(65) bis(2-isocyanatoethyl)bicyclo[2.2.1]hept-2-ene-5,
6-dicarboxylate
1,6-hexanediamine
(66) bis(4-isocyanatophenyl)methane
5,6-di(aminomethyl)bicyclo[2.2.1]hept-2-ene
(67) 2,4-(2,5 or 2,6)tolylene diisocyanate
5,6-diaminobicyclo[2.2.1]hept-2-ene (50)
1,6-hexanediamine (50)
(68) 1,6-diisocyanatohexane (50)
5,6-diisocyanatomethylbicyclo[2.2.1]hept-2-ene (50)
1,2-ethylene diamine
(69) 5,6-di(aminomethyl)bicyclo-hept-2-ene
bis(4-chloroformylchlorohexyl)methane As previously indicated the vinyl backbone radiation convertible polymers can be produced indirectly. Thus, for example, a copolymer of 5-chlorobicyclo[2.2.1]hept-2-ene with ethylene can be produced by a conventional high pressure, free-radical catalytic process. The resulting copolymer can then be dehydrohalogenated by conventional means to produce a radiation convertible copolymer, as illustrated by the simple model:

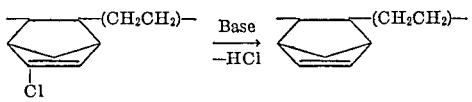

A direct method for the production of vinyl backbone radiation convertible polymers can also be used. In this method a norbornadiene, substituted or unsubstituted, is copolymerized with a polymerizable ethylenically unsaturated monomer, that contains the polymerizable $CH_2=C<$ group. These ethylenically unsaturated monomers are defined infra, though the list is not all inclusive. The monomers are well known as are the processes for their polymerization; conventional polymerization procedures known to those skilled in the art are used to produce the vinyl backbone radiation convertible polymers.

PENDANT RADIATION CONVERTIBLE POLYMERS

Radiation convertible polymers in which the norbornenyl group is pendant to the polymer backbone are readily produced by conventional procedures. This class of radiation convertible polymers contains the norbornenyl ring attached to the polymer chain via a monovalent bond as illustrated below.

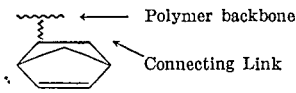

For the purposes of this invention such polymers will be known by the term "pendant radiation convertible polymers."

These radiation convertible polymers can be produced directly by polymerization of a substituted norbornene compound in which the substituent is a polymerizable ethylenic group of the formula $CH_2=C<$ either alone or in combination with other polymerizable ethylenically unsaturated monomers. They can also be produced by modification of a preformed polymer.

The polymerizable ethylenically unsaturated norbornene compounds suitable for use in the production of radiation convertible polymers by the direct polymerization process are those of the formula (IX) 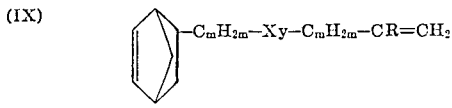

and epoxides thereof wherein the oxirane ring of said epoxides is located in the chain, in which R is hydrogen, alkyl of from 1 to 3 carbon atoms or chlorine; $m$ is an integer having a value of from 0 to 4; X is a keto group

an ether linkage —O—, an ester group

an amide group

or urethane group

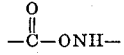

and $y$ is 0 or 1. The —$C_mH_{2m}$— groups can be linear or branched.

The following subgeneric classes fall within the scope of Formula IX. The symbol "Norb" represents the norbornenyl radical and $p$ has a value of from 1 to 4.

*Olefins*
Norb—CR=CH$_2$
Norb—C$_p$H$_{2p}$—CR=CH$_2$

*Ethers*
Norb—O—CR=CH$_2$
Norb—O—C$_p$H$_{2p}$—CR=CH$_2$
Norb—C$_p$H$_{2p}$—O—CR=CH$_2$
Norb—C$_p$H$_{2p}$—O—C$_p$H$_{2p}$—CR=CH$_2$

*Ketones*

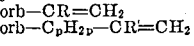
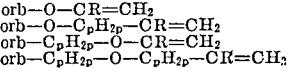
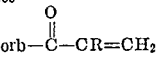
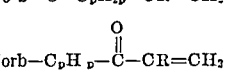
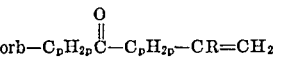

*Esters*
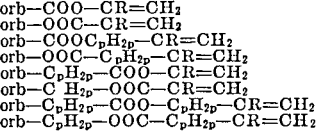

*Amides*
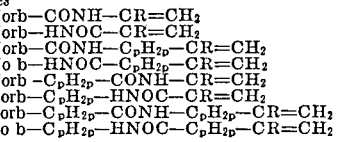

*Urethanes*
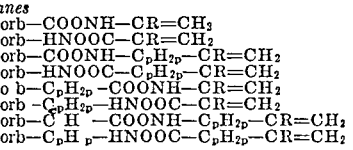

The following table lists formulas of specific compounds falling within the scope of Formula IX. This tabulation is illustrative only and is not to be considered a complete tabulation of all possible compounds. In the table the norbornenyl moiety is not portrayed; the table sets forth that portion represented by the

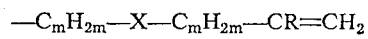

section of the compound only, with the units connected in the order shown to the norbornenyl nucleus.

Norb—$C_mH_{2m}$—X—$C_mH_{2m}$—CR=$CH_2$ compounds

| —$C_mH_{2m}$— | —X— | —$C_mH_{2m}$— | —CR=$CH_2$ |
|---|---|---|---|
| | | | —CH=$CH_2$ |
| | | | —C($C_3H_7$)=$CH_2$ |
| | | —$CH_2$— | —CH=$CH_2$ |
| | | —$CH_2$— | —C($CH_3$)=$CH_2$ |
| | | —$C_2H_4$— | —CH=$CH_2$ |
| | | | —C($CH_3$)=$CH_2$ |
| | —O— | | —CH=$CH_2$ |
| | —O— | —$CH_2$— | —CH=$CH_2$ |
| | —O— | —$C_2H_4$— | —CH=$CH_2$ |
| | —O— | | —C($CH_3$)=$CH_2$ |
| | —O— | —$C_4H_8$— | —CH=$CH_2$ |
| —$CH_2$— | —O— | | —CH=$CH_2$ |
| —$C_3H_6$— | —O— | | —CH=$CH_2$ |
| —$C_2H_4$— | —O— | | —C($CH_3$)=$CH_2$ |
| —$CH_2$— | —O— | —$CH_2$— | —CH=$CH_2$ |
| —$CH_2$— | —O— | —$C_3H_6$— | —CH=$CH_2$ |
| —$C_4H_8$— | —O— | —$C_4H_8$— | —CH=$CH_2$ |
| | —C(=O)— | | —CH=$CH_2$ |
| | —C(=O)— | —$CH_2$— | —CH=$CH_2$ |
| | —C(=O)— | —$C_2H_4$— | —CH=$CH_2$ |
| | —C(=O)— | —$C_2H_4$— | —C($CH_3$)=$CH_2$ |
| —$CH_2$— | —C(=O)— | | —CH=$CH_2$ |
| —$C_2H_4$— | —C(=O)— | | —CH=$CH_2$ |
| —$C_4H_8$— | —C(=O)— | | —CH=$CH_2$ |
| —$CH_2$— | —C(=O)— | —$CH_2$— | —CH=$CH_2$ |
| —$C_3H_6$— | —C(=O)— | —$C_3H_6$— | —CH=$CH_2$ |
| —$C_4H_6$— | —C(=O)— | —$CH_2$— | —CH=$CH_2$ |
| | —COO— | | —CH=$CH_2$ |
| | —COO— | | —C($C_2H_5$)=$CH_2$ |
| | —OOC— | | —CH=$CH_2$ |
| | —OOC— | | —C($CH_3$)=$CH_2$ |
| | —OOC— | | —CCl=$CH_2$ |
| | —COO— | —$CH_2$— | —CH=$CH_2$ |
| | —COO— | —$C_2H_4$— | —CH=$CH_2$ |
| | —COO— | —$C_4H_8$— | —CH=$CH_2$ |
| | —OOC— | —$CH_2$— | —CH=$CH_2$ |
| | —OOC— | —$CH_2$— | —C($CH_3$)=$CH_2$ |
| | —OOC— | —$C_2H_4$— | —CH=$CH_2$ |
| | —OOC— | —$C_3H_6$— | —CH=$CH_2$ |
| | —COO— | | —CH=$CH_2$ |
| —$C_2H_4$— | —COO— | | —C($CH_3$)=$CH_2$ |
| —$C_2H_4$— | —COO— | | —CH=$CH_2$ |
| —$CH_2$— | —OOC— | | —CH=$CH_2$ |
| —$C_3H_6$— | —OOC— | | —C($CH_3$)=$CH_2$ |
| —$C_2H_4$— | —OOC— | | —CH=$CH_2$ |
| —$CH_2$— | —COO— | —$CH_2$— | —CH=$CH_2$ |
| —$C_4H_8$— | —COO— | —$C_2H_4$— | —CH=$CH_2$ |
| —$C_3H_6$— | —COO— | —$CH_2$— | —C($CH_3$)=$CH_2$ |
| —$CH_2$— | —OOC— | —$CH_2$— | —CH=$CH_2$ |
| —$C_3H_6$— | —OOC— | —$CH_2$— | —CH=$CH_2$ |
| —$C_2H_4$— | —OOC— | —$CH_2$— | —CH=$CH_2$ |
| —$C_4H_8$— | —OOC— | —$C_2H_4$— | —CH=$CH_2$ |
| | —CONH— | | —CH=$CH_2$ |
| | —HNOC— | | —CH=$CH_2$ |
| | —HNOC— | | —C($CH_3$)=$CH_2$ |
| | —CONH— | —$CH_2$— | —CH=$CH_2$ |
| | —CONH— | —$CH_2$— | —C($CH_3$)=$CH_2$ |
| | —CONH— | —$C_2H_4$— | —CH=$CH_2$ |
| | —CONH— | —$C_3H_6$— | —CH=$CH_2$ |
| | —HNOC— | —$CH_2$— | —CH=$CH_2$ |
| | —HNOC— | —$C_2H_4$— | —C($CH_3$)=$CH_2$ |
| | —HNOC— | —$C_4H_8$— | —CH=$CH_2$ |
| —$CH_2$— | —CONH— | | —CH=$CH_2$ |
| —$C_2H_4$— | —CONH— | | —C($CH_3$)=$CH_2$ |
| —$C_3H_4$— | —CONH— | | —CH=$CH_2$ |
| —$C_4H_8$— | —CONH— | | —CH=$CH_2$ |
| —$CH_2$— | —HNOC— | | —CH=$CH_3$ |
| —$C_2H_4$— | —HNOC— | | —CH=$CH_2$ |
| —$C_4H_8$— | —HNOC— | | —CH=$CH_2$ |
| —$CH_2$— | —CONH— | —$CH_2$— | —CH=$CH_2$ |
| —$C_4H_8$— | —CONH— | —$C_2H_4$— | —CH=$CH_2$ |
| —$C_2H_4$— | —CONH— | —$CH_2$— | —C($CH_3$)=$CH_2$ |
| —$C_3H_6$— | —CONH— | —$C_4H_8$— | —CH=$CH_2$ |
| —$CH_2$— | —HNOC— | —$CH_2$— | —C($CH_3$)=$CH_2$ |
| —$CH_2$— | —HNOC— | —$C_3H_6$— | —CH=$CH_2$ |
| —$C_2H_4$— | —HNOC— | —$CH_2$— | —CH=$CH_2$ |
| —$C_4H_8$— | —HNOC— | —$C_2H_4$— | —CH=$CH_2$ |
| | —COONH— | | —CH=$CH_2$ |

Norb—$C_mH_{2m}$—X—$C_mH_{2m}$—CR=$CH_2$ compounds.—Con.

| —$C_mH_{2m}$— | —X— | —$C_mH_{2m}$— | —CR=$CH_2$ |
|---|---|---|---|
| | —COONH— | | —C($CH_3$)=$CH_2$ |
| | —HNOOC— | | —CH=$CH_2$ |
| | —HNOOC— | | —C($CH_3$)=$CH_2$ |
| | —COONH— | —$CH_2$— | —CH=$CH_2$ |
| | —COONH— | —$C_2H_4$— | —C($CH_3$)=$CH_2$ |
| | —COONH— | —$C_4H_8$— | —CH=$CH_2$ |
| | —HNOOC— | —$CH_2$— | —CH=$CH_2$ |
| | —HNOOC— | —$C_2H_4$— | —CH=$CH_2$ |
| | —HNOOC— | —$C_3H_4$— | —CH=$CH_2$ |
| | —HNOOC— | —$CH_2$— | —C($CH_3$)=$CH_2$ |
| —$CH_2$— | —COONH— | | —CH=$CH_2$ |
| —$C_2H_4$— | —COONH— | | —CH=$CH_2$ |
| —$C_3H_6$— | —COONH— | | —CH=$CH_2$ |
| —$CH_2$— | —HNOOC— | | —CH=$CH_2$ |
| —$C_3H_6$— | —HNOOC— | | —CH=$CH_2$ |
| —$C_4H_8$— | —HNOOC— | | —CH=$CH_2$ |
| —$CH_2$— | —COONH— | —$CH_2$— | —CH=$CH_2$ |
| —$C_2H_4$— | —COONH— | —$C_2H_4$— | —CH=$CH_2$ |
| —$C_4H_8$— | —COONH— | —$CH_2$— | —CH=$CH_2$ |
| —$CH_2$— | —HNOOC— | —$CH_2$— | —CH=$CH_2$ |
| —$C_3H_6$— | —HNOOC— | —$C_2H_4$— | —CH=$CH_2$ |
| —$C_4H_8$— | —HNOOC— | —$C_4H_6$— | —CH=$CH_2$ |

As previously indicated the polymerizable ethylenically unsaturated norbornene compounds of Formula IX can be copolymerized with other known polymerizable ethylenically unsaturated comonomers that also contain the polymerizable $CH_2$=C< group. Illustrative thereof one can mention the alpha-olefins containing from 2 to about 8 carbon atoms such as ethylene, propylene, butene-1, and the like; acrylic acid and its derivatives, such as acrylonitrile, methacrylonitrile, acrylamide, methacrylamide, methacrylic acid, methylmethacrylate, ethyl methacrylate, ethyl acrylate, and the like; the vinyl halides such as vinyl chloride, vinylidene chloride, vinyl fluoride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alpha-chlorovinyl methyl ketone, and the like; the vinyl thioethers such as vinyl ethyl sulfide, vinyl p-tolyl sulfide, divinyl sulfide, and the like. Other polymerizable comonomers which can be copolymerized are styrene, divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. The comonomers can be used individually or in mixtures containing two or more thereof.

Then pendant radiation convertible polymers can be homopolymers of the ethylenically unsaturated norbornene compounds of the Formula IX. They can also be copolymers thereof with one or more ethylenically unsaturated comonomers wherein the comonomers content can be as high as 98 weight percent. Preferably, however, the comonomer content will be from about 60 to about 90 weight percent.

The direct polymerization can be carried out by any of the known catalytic procedures, in bulk, in a solvent, by an aqueous emulsion process, by an aqueous dispersion process, etc. Those skilled in the art are well familiar with such processes and the manner in which they are conducted. Thus, for example, the polymerization can be carried out in the presence of a free radical initiator at atmospheric or superatmospheric pressures up to 60,000 p.s.i.g. or higher, and at temperatures of from about 30° C. to about 350° C. The peroxides, persulfates, perborates, percarbonates, peroxydicarbonates, etc. are known catalyst classes, as is oxygen itself. Illustrative catalysts are hydrogen peroxide, persuccinic acid, lauroyl peroxide, butyryl peroxide, benzoyl peroxide, acetyl peroxide, peracetic acid, diisopropyl peroxydicarbonate, lauroyl peroxide, sodium persulfate, sodium perborate, sodium percarbonate, and the like. The concentration of the free radical catalyst can vary from 10 parts per million to about 5,000 parts per million, preferably from about 25 parts per million to about 250 parts per million, based on the monomers feed charged. The emulsion and dispersion processes are generally carried out at from 30° C. to about 100° C. using either a free radical catalyst or a redox catalyst system such as the potassium persulfate-sodium bisulfite, hydrogen peroxide-iron salts, cumene hydroperoxide-ferrous salts, peracetic acid-alkyl mercaptan redox systems; these processes are well known.

The pendant radiation convertible polymers can also be produced indirectly by modification of a preformed polymer such as a polyester, polyamide, polyether, polyurethane, polyurea, polysiloxane, vinyl, epoxy, phenoxy, phenolic, natural polymers such as wool or cellulose and derivatives thereof, and the like. These preformed polymers are known. For example, polyvinyl alcohol or hydrolyzed polyvinyl acetate polymers can be reacted with a norbornenyl compound having a reactive group thereon. This is shown below by the reaction of the hydrolyzed copolymer of ethylene and vinyl acetate with 5-isocyanatomethylbicyclo[2.2.1]hept-2-ene.

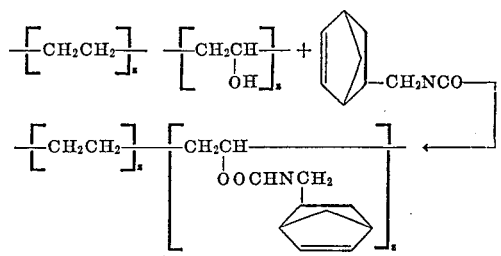

One can also react the hydroxyl group of the above hydrolyzed copolymer with an acid chloride such as the acid chloride of bicyclo[2.2.1]hept-2-ene-5-carboxylic acid to produce a radiation convertible polymer having the pendant group

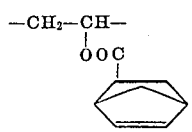

A phenoxy pendant radiation convertible polymer can be produced as shown by the following reaction sequence

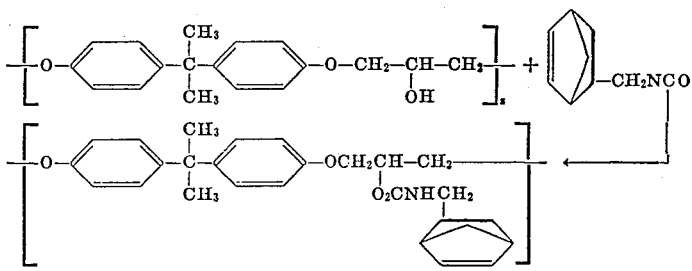

The phenolic pendant radiation convertible polymers are produced in a somewhat similar manner

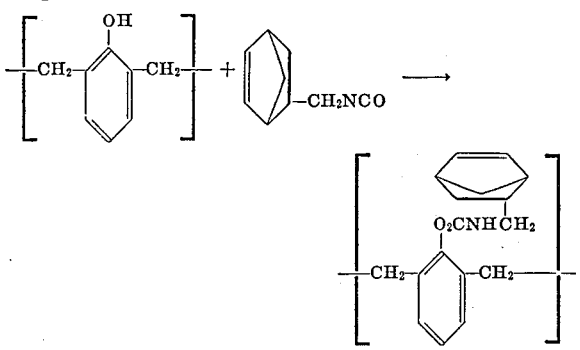

Polyamides can be reacted with the ester chloride as follows

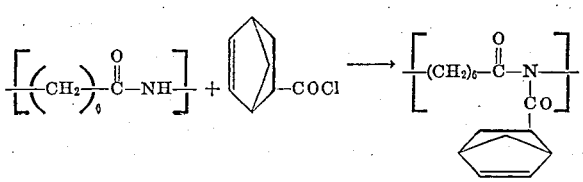

The norbornenyl group can be formed on the polymer by a Diels-Alder reaction, as illustrated by the following equations:

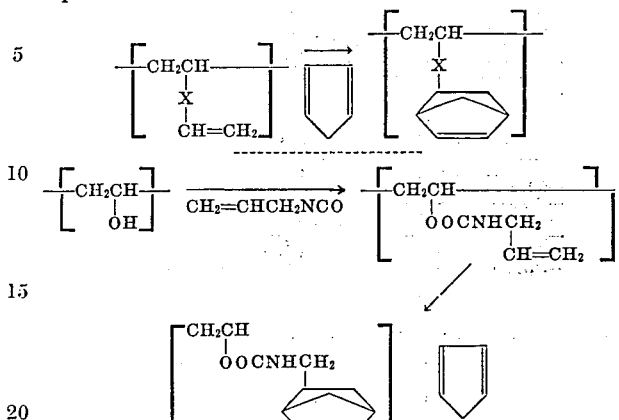

A still further method is the dehydrochlorination of a chlorinated norborane:

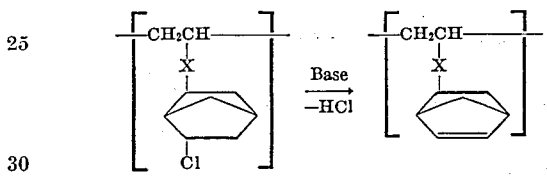

All of the indicated reactions can be carried out by conventional, known chemical reactions that are readily apparent to one skilled in the art. This listing is not to be considered limitative of the methods that can be used; it is submitted for illustrative purposes only.

The concentration of the norbornenyl group in the radiation convertible polymer, whether it be a backbone radiation convertible polymer or a pendant radiation convertible polymer, can vary from about one mole percent up to 100 mole percent. Preferably it is at least about 10 mole percent.

The radiation convertible polymers can be blended with other polymers if desired, for example, vinyl polymers, polyolefins, polyvinyl halides, polyacrylonitrile, polyesters, polyamides, polyureas, polyurethanes, polyalkylene oxides, polycarbonates, polyformaldehydes, polystyrenes, polyacrylates, polyvinyl esters, polyvinylidene halides, polyethers, polysaccharides, regenerated wool, silicone polymers, polysulfides, polysulfones, formaldehyde resins, and the heterocyclic polymers such as polybenzimidazoles, polypyromellitamides, polybenzoazoles, and the like. In such instances, the concentration of radiation convertible in the blend should be such that the blend contains about 5 weight percent radiation convertible polymer, and can be up to about 99 weight percent. In some instances the concentration can be lower. The blends can be produced by any conventional blending procedure, for example by milling, solution blending, etc.

The following examples further serve to describe the invention.

Example 1

A 300 gram sample of an ethylene/vinyl acetate copolymer having about 16.2 weight percent vinyl acetate content and a melt index of 2.9 dgm./min. was dissolved in 1400 grams of toluene by heating the mixture in a three liter flask fitted with a reflux condenser. Methanol, 129 grams, was added to the stirred solution at 70° C. and after the reaction mixture had cooled to 60° C., 23.2 grams of a 25 percent methanolic solution of sodium methoxide was added. The solution was refluxed for three hours, cooled and poured into methanol. The hydrolyzed copolymer was recovered by filtration and reslurried in methanol until the methanol filtrate was neutral. The ethylene/vinyl alcohol copolymer obtained was vacuum dried and infra-red analysis established that hydrolysis had occurred to the extent of about 97 percent.

(A) One hundred grams of the ethylene/vinyl alcohol copolymer (equivalent to 0.204 mole of vinyl alcohol) was charged to a flask. Benzene, 700 ml., was added and about 10 percent of the solvent was azeotropically distilled to remove traces of water that might be present. The solution was cooled to 70° C. and a few drops of dibutyl tin dilaurate were added. 5 - isocyanatomethylbicyclo-[2.2.1]hept-2-ene, 9.6 grams, produced as disclosed in U.S. 3,222,387, was added and the solution was agitated for thirty minutes at a temperature of 70° C. This amount of 5-isocyanatomethylbicyclo[2.2.1]hept-2-ene was sufficient to react with about 31 mole percent of the available free hydroxyl groups and form the urethane linkage. Infrared spectroscopy showed that all of this isocyanate had reacted. The remainder of the free hydroxyl groups were reacted with an excess of methyl isocyanate, 12.5 grams, by refluxing for an additional hour. The resulting radiation convertible polymer was precipitated and washed in methanol and then dried in a vacuum oven at 50° C. The polymer contained the following groups in the molecule, with about 8 percent by weight of the polymer being the N-(5-norbornen-2-ylmethyl)carbamyloxy group.

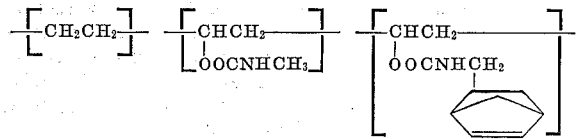

(B) In a second run 67 grams of the ethylene/vinyl alcohol copolymer was reacted with 14 grams of 5-isocyanatomethylbicyclo[2.2.1]hept-2-ene and 10 grams of methyl isocyanate to produce a radiation convertible polymer having an N-(5-norbornen-2-ylmethyl)carbamyloxy group content of about 17 weight percent. The procedure used was the same as described above.

(C) A control polymer was prepared which contained about 18.4 weight percent N-methylcarbamyloxy group and no N-(5-norbornen-2-ylmethyl)carbamyloxy group. This was produced by reacting the ethylene/vinyl alcohol polymer with methyl isocyanate only.

Portions of polymer samples (B) and (C) were blended by milling with 0.5 weight percent acetophenone as the photosensitizer. All of the polymers both with and without photosensitizer, were then molded into plaques 5 inches in diameter and 0.02 inch thick. Portions of all of the plaques were all completely soluble in hot benzene prior to irradiation.

All of the plaques were exposed to a 100 watt medium pressure quartz mercury arc. Samples were cut from the exposed portions at appropriate intervals and the extent of crosslinking was determined by extraction with hot benzene to constant weight. The results are tabulated below; the figures in the table represent the weight percent insoluble polymer after exposure for the period of time, in hours, indicated in the left hand column. It is evident that the radiation convertible polymers of this invention (A) and (B) showed that a much greater amount of crosslinking had occurred than in the control (C).

| | 1A | 1B | | 1C | |
|---|---|---|---|---|---|
| | b[2] | a[1] | b[2] | a[1] | b[2] |
| Time, hours: | | | | | |
| ½ | 2.0 | 18.1 | 0.5 | 0.1 | 0.1 |
| 1 | 3.0 | 29.6 | 9.7 | 0.7 | 0.3 |
| 2 | 21.3 | 35.3 | 16.5 | 2.1 | 0.2 |
| 5 | 21.7 | 54.6 | 23.9 | 5.4 | 0.6 |
| 10 | 27.6 | 61.3 | 33.5 | 11.1 | 0.7 |
| 20 | | 68.4 | 50.2 | 19.2 | 1.7 |

[1] a = With photosensitizer.
[2] b = Without photosensitizer.

Example 2

(A) Into a 500 ml. five-neck flask equipped with an electric stirrer, brine-cooled reflux condenser, dropping funnel, thermometer, and nitrogen ebullition tube there was placed 135 grams of deaerated water, 15 grams of anionic surfactant, 70 grams of ethyl acrylate, 28 grams of methyl methacrylate, 2 grams of 5-norbornen-2-ylmethyl acrylate and 2 grams of cumene hydroperoxide. The reaction was initiated by the addition of 1 ml. of 10 percent aqueous ferrous sulfate heptahydrate solution; the temperature rose to about 40° C. within about five minutes. This temperature was maintained for 1½ hours by the slow dropwise addition of a 10 percent aqueous sodium bisulfite solution. The reaction was stopped before the polymerization had run to completion by cooling the latex with an ice bath and the addition of 3 ml. of a 10 percent aqueous hydroquinone solution. The radiation convertible terpolymer in the latex contained the following groups in the molecule at a weight ratio of about 70:28:2, respectively:

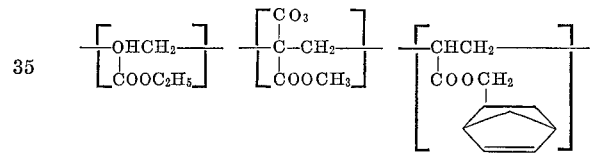

(B) In a manner similar to that described above a control polymer was produced which did not contain 5-norbornen-2-ylmethylacrylate. The copolymer contained about 70 weight percent polymerized ethyl acrylate and about 30 weight percent polymerized methyl methacrylate. In the preparation of this control sample, the sodium bisulfite addition was continued until the reaction was judged complete.

To one hundred gram portions of each latex there was added one gram of an emulsion containing the photosensitizer acetophenone. This emulsion contained 50 grams of acetophenone, 5 grams of the nonyl phenyl polyethylene glycol ether surfactant (having an average of 10.5 moles ethylene oxide) and 195 grams of water. Two films from each of the latex compositions were cast on glass plates and allowed to dry in the dark. One film of each pair was stored in the dark, while its mate was irradiated by exposure to two 40 watt Westinghouse Fluorescent Sunlamps at a distance of four inches for 3 days. The extent of crosslinking after three days was determined by testing for insolubility by shaking overnight in 49 times the sample weight of a 90:10 acetone:water solution. The results are set forth below

| | Percent insolubility | |
|---|---|---|
| | Dark storage | Irradiated |
| Sample: | | |
| 2A | 5.4 | 87.9 |
| 2B | 0 | 14.7 |

The date clearly shows that the presence of the polymerized 5-norbornen-2-ylmethyl acrylate produced a radiation convertible polymer that crosslinked to a high degree under mild conditions. The amount of crosslinking upon irradiation was six times greater in the terpolymer containing the 5-norbornen-2-ylmethyl acrylate than in the control.

Example 3

One hundred grams of an ethylene/vinyl alcohol copolymer (produced by the hydrolysis of an ethylene/vinyl acetate copolymer as described in Example 1 and equivalent to 0.125 mole of vinyl alcohol), 500 ml. of benzene and 10 ml. of pyridine were charged to a one liter flask equipped with a stirrer, a condenser (attached to a nitrogen supply and bubbler), a dropping funnel, and a thermowell with a thermocouple. Fifty ml. of the solution were azeotropically distilled to remove any traces of water that might have been present. Then 20.5 grams of 5-chloroformyl-2-norbornene was added over a 15-minute period to the refluxing solution. The mixture was refluxed for an additional hour, cooled to 40° C. and transferred to a large beaker. Methanol was slowly added with stirring until the solution was cloudy, then 2 liters of methanol was added quickly. The ethylene/vinyl 5-norbornene-2-carboxylate copolymer was filtered, washed three times in methanol and dried. The yield was 63.3 grams. Elemental analysis for carbon was 83.14 percent; theoretical value is 83.63 percent. The radiation convertible copolymer contained the following groups:

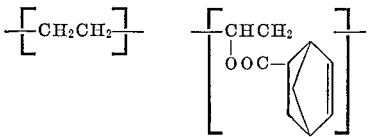

and the concentration of the above norbornenyl-containing group in the copolymer was about 15 percent by weight.

The radiation convertible copolymer (A) was formed into a film 22 mils thick and film samples were exposed to radiation from a 100 watt Hanovia medium-pressure mercury arc at a temperature of less than 50° C. The extent of crosslinking achieved as determined by the percent insolubilization after different exposure periods is set forth below:

| Time, hrs.: | Percent insolubilization |
| --- | --- |
| 0.5 | 9.6 |
| 1.0 | 28.0 |
| 2.0 | 32.8 |
| 5.0 | 52.0 |

Film samples of the above were also radiated with an electron beam from a 1 mev. Van de Graaff accelerator and the extent of crosslinking determined at different dosages. The film was radiated in a sealed polyethylene bag under nitrogen, at room temperature. For control purposes, a film from an ethylene/vinyl acetate copolymer (B) (85.15 weight ratio) was similarly treated. The extent of crosslinking that was achieved by Van de Graaff irradiation was determined by extraction of their radiated copolymer with benzene at 60° C. for 100 hours. The ethylene/vinyl 5-norbornene-2-carboxylate copolymer was 53.3 percent insoluble after a radiation dose of 0.1 mrad; with a 0.5 mrad dose the copoylmer was 82.1 percent insoluble; and with a 1 mrad dose it was 92.3 percent soluble; 2 mrads yielded a copolymer that was 95.8 percent insoluble. The ethylene/vinyl acetate copolymer, however, showed little crosslinking with a 1 mrad dose; the percent insolubilization was only one percent; with 2 mrads this copolymer was only 26.6 percent insoluble; and with a massive dosage of 7 mrads only 79.4 percent insolubilization was achieved. These results are tabulated below for ready comparison.

| Dose, mrads.: | Percent insolubilization | |
| --- | --- | --- |
| | Polymer A[1] | Polymer B[2] |
| 0.1 | 53.3 | 0 |
| 0.5 | 82.1 | 0 |
| 1 | 92.3 | 1.0 |
| 2 | 95.8 | 26.6 |
| 7 | | 79.4 |

[1] Ethylene/vinyl 5-norbornene-2-carboxylate copolymer.
[2] Ethylene/vinyl acetate copolymer.

The data clearly reveals the remarkable enhancement of crosslinking at low dosages achieved by the radiation convertible copolymer containing the pendant norbornenyl groups. Thus, at 1 mrad, where the control copolymer, Polymer B, was crosslinked only to the extent of one percent, the norbornenyl-containing radiation convertible copolymer, Polymer A, was almost completely crosslinked, to the extent of 92.3 percent.

Example 4

A series of pendant radiation convertible polymers was produced using different poly(vinyl alcohol) resins. The poly(vinyl alcohol) was reacted with 5-norbornen-2-ylmethyl isocyanate. In some instances methyl isocyanate was also reacted with the polymer. In general the reactions were carried out as follows:

A flask equipped with a stirrer, condenser, dropping funnel and temperature recording means was charged with 44 grams of the selected poly(vinyl alcohol) and 400 grams of dimethylformamide. The mixture was heated to 90° C., cooled to 70° C. and two drops of dibutyltin dilaurate were added. After further stirring for several minutes, 5 grams of methyl isocyanate was added through the dropping funnel in those instances in which it was used. Fifteen minutes after completion of the methyl isocyanate addition, the indicated amount of 5-norbornen-2-ylmethyl isocyanate was slowly added at a rate to maintain the reaction temperature at 75° C. and the reaction mixture was stirred at 70° C. for another hour. The polymer was filtered, washed once with hexane, twice with acetone, and then vacuum dried at 50° C.

The vinyl alcohol/vinyl N-(5-norbornen-2-ylmethyl)-carbamate radiation convertible copolymers produced contain the following groups:

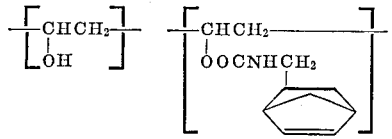

The radiation convertible terpolymers produced with the further addition of methyl isocyanate additionally contain the group:

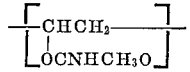

In addition, when hydrolysis of the polyvinyl acetate was not complete, the polymer also contained some polymerized vinyl acetate groups.

The radiation convertible polymers were cast into films about 2 to 5 mils thick and the films were irradiated. Prior to irradiation those copolymers that contain up to about 30 weight percent of the vinyl N-(5-norbornen-2-ylmethyl) carbamate are soluble in hot water or in a 50–50 by volume ethanol-water mixture; those copolymers containing more than 30 weight percent of the vinyl N(5-norbornen-2-ylmethyl)carbamate group were not soluble in water but produced dispersion or emulsions in the ethanol-water mixture. The films were readily cast from the aqueous solutions or emulsions. The cast films were irradiated with a 100 watt medium-pressure quartz mercury arc for the indicated period of time and the extent of crosslinking was determined by extraction with the ethanol-water mixture at the boil. The results are tabulated below:

| | Polyvinyl alcohol | | | Norbornenyl compound [2] | | Percent insoluble after irradiation | |
|---|---|---|---|---|---|---|---|
| | Red. viscosity [1] | Mole percent, hydrolyzed | CH₃NCO | Weight percent in resin | Mole percent, in resin | 1 hour | 10 hours |
| Run: | | | | | | | |
| 1 | 1.501 | 99-100 | Yes | 13 | | 18 | 53 |
| 2 | 0.886 | 99-100 | No | 18 | 4.8 | 31 | 67 |
| 3 | 0.293 | 89 | do | 44 | 16.7 | 2 | 62 |
| 4 | 0.293 | 89 | do | 59 | 22.2 | 6 | 100 |

[1] Determined from a 0.2 percent solution in water at 30° C.
[2] 5-norbornen-2-ylmethyl isocyanate.

The insolubilization and crosslinking of the radiation convertible polymers was completely unexpected and unobvious since the prior art had previously taught that polyvinyl alcohol degrades by chain fission when exposed to ionizing or ultraviolet radiation (K. Tabakura, G. Takayama and J. Ukida, Journal Applied Polymer Science, vol. 9, page 3217, 1965). The prior art has also taught that exposure to as much as 100 mrad of gamma radiation will not insolubilize polyvinyl alcohol (I. Sakurada and S. Matsuzama, Kobunshi Kagaka, vol. 17, page 693, 1960; C. A. 55, 25728c).

Example 5

A portion of the ethylene/vinyl 5-norbornene-2-carboxylate radiation convertible copolymer of Example 3 was pressed into a plaque 5 inches in diameter and 0.02 inch thick and irradiated with an electron beam from a one mev. Van de Graaff accelerator. For control purposes a film from the original ethylene/vinyl acetate copolymer was also produced and irradiated. The percent insolubilization was determined by extraction with benzene at 60° C. on film samples that had been irradiated at different dosages as a measure of the amount of crosslinking. The results are tabulated below:

| | Percent insolubilization | |
|---|---|---|
| | Copolymer [1] | Control [2] |
| Dose, mrads: | | |
| 0.06 | 36.0 | |
| 0.3 | 81.5 | |
| 0.6 | 91.2 | |
| 0.96 | | 0.84 |
| 1.2 | 96.0 | |
| 1.86 | | 32.5 |
| 2.4 | 98.3 | |
| 3.6 | 99.0 | 63.7 |
| 6.0 | 99.5 | |
| 7.8 | | 83.4 |
| 9.9 | 99.8 | |
| 12 | | 90.0 |
| 18 | | 91.4 |
| 36 | | 96.5 |

[1] Ethylene/vinyl 5-norbornene-2-carboxylate copolymer.
[2] Ethylene/vinyl acetate copolymer.

The data shows that the radiation convertible copolymer was essentially completely crosslinked with a dose of about 0.6 mrad; thirty times as much radiation, 18 mrad, was necessary to give the same amount of crosslinking in the control. The data also shows that while essentially complete crosslinking of the radiation convertible polymer was obtained with a dose of less than about 1 mrad, the control copolymer showed essentially no crosslinking whatsoever at this dosage rate.

Example 6

A series of vinyl alcohol/vinyl N-(5-norbornene-2-ylmethyl)carbamate radiation convertible copolymers was produced in a manner similar to that described in Example 4. The vinyl alcohol polymer used as the starting material had a reduced viscosity of 0.3 as determined from a 0.2 percent aqueous solution at 30° C. The amounts of 5-isocyanatomethyl-2-norbornene used were varied to produce radiation convertible copolymers which contained 29.0, 43.7 and 58.6 weight percent (8.5, 16.7 and 22.2 mole percent) of vinyl N-(5-norbornen-2-yl-methyl)carbamate. Clear films, about 2 to 5 mils thick, of these copolymers were irradiated with ultraviolet light from a 100 watt medium-pressure mercury arc. Samples were periodically cut from the films and the extent of insolubilization and crosslinking was determined as disclosed in Example 4. The data indicated that crosslinking occurred at a faster rate and also to a greater extent as the vinyl N-(5-norbornen-2-yl-methyl)carbamate content was increased. The data in the following table sets forth the maximum crosslinking achieved with each film and the time required to reach it; further radiation did not result in any further appreciable crosslinking.

| | Norbornenyl content | | Hours of radiation | Percent insolubilization |
|---|---|---|---|---|
| | Weight, percent | Mole, percent | | |
| Film: | | | | |
| 1 | 58.6 | 22.2 | 10 | 99 |
| 2 | 43.7 | 16.7 | 20 | 82 |
| 3 | 29.0 | 8.5 | 30 | 26 |

Example 7

(A) 5-norbornene-2,3-dicarboxylic anhydride, 328 grams, and propylene glycol, 167 grams, were charged to a 1 liter 4-neck, round bottom flask fitted with an air-driven paddle stirrer, thermometer, a 12 inch long column packed with Raschig rings and attached to a steam condenser, and a nitrogen sparger. The flask was heated to 200° C. and held at this temperature for six hours. The radiation convertible polyester was a light yellow, slightly tacky solid with an acid number of 28.8.

To 50 grams of this polyester there was added 21.5 grams of styrene and 7 milligrams of hydroquinone and the mixture was rolled overnight to effect solution of the resin in the styrene. Steel panels, 2¾ by 6 inches, were coated with the solution and they were irradiated at a distance of 4 inches with a 100 watt medium-pressure mercury arc in a nitrogen atmosphere. The amount of curing was determined by boiling the panel in toluene for 10 minutes and visually observing the amount of material removed. After 10 minutes irradiation, all the polyester was washed off the panel. One hour's irradiation, however, was sufficient to crosslink the coating so that the refluxing toluene had no effect.

(B) Toluene, 250 milliliters, pyridine, 59.3 grams, and polyethylene glycol of molecular weight 411, 100.75 grams, were charged to a 500 milliliter 4-neck round bottom flask fitted with an air driven paddle stirrer, thermometer, reflux condenser and dropping funnel. 5-norbornene-2,3-dicarboxylic acid chloride was added rapidly by means of the dropping funnel to the stirred reaction mixture. The temperature rose spontaneously to 80° C. Heat was applied and the mixture was refluxed for one hour, cooled, washed several times with water and then dried over anhydrous magnesium sulfate. The radiation convertible polyester was recovered as a residue product after stripping off the solvents.

Exposure of glass panels coated with the radiation convertible polyester to a 100 watt medium-pressure mercury arc resulted in crosslinking as determined by the amount of solubilization in toluene and established that styrene was not the cause of the crosslinking. The data are given in the following table.

| Irradiation time, hours: | Percent insolubilization |
|---|---|
| 0 | 0 |
| 0.5 | 29.1 |
| 1 | 53.1 |
| 2 | 72.9 |
| 5 | 83.6 |

Further irradiation did not result in further appreciable crosslinking.

Example 8

5,6-di(hydroxymethyl)-2-norbornene, 30.8 grams, was placed in a resin reactor equipped with stirrer, dropping funnel and nitrogen purger. The reactor was heated by an external oil bath to 125° C., the nitrogen purge was begun, and, with vigorous stirring, hexamethylene-1,6-diisocyanate, 33.64 grams, was added over a period of 1.5 hours. During this period, the temperature was gradually raised to 170° C. The resulting backbone radiation convertible urethane polymer was clear and softened at about 120° C. Plaques, melt-pressed from the urethane polymer, were tough and transparent.

A 15% solution of the polymer was prepared in 1:1 volume chloroform-ethanol solution. Films cast onto polytetrafluoroethylene films were clear, transparent and flexible. The polymer had repeating units of the structure:

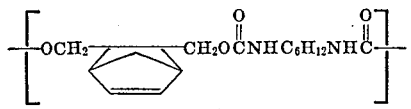

Sample strips were cut from a 5 in. plaque (about 20 mils thick) and irradiated with a 100 watt medium pressure mercury arc in a nitrogen atmosphere. At specified time intervals, about 0.5 gram pieces were removed, placed in wire gauze cups, weighed and extracted in sealed bottles at 60° C. with a chloroform-ethanol mixture (100 ml., 1:1 v./v.). After four days the gauze cups and contents were removed, dried and weighed again. After weighing, the gauze cups were put in jars and the process repeated using fresh solvent and a 2 days extraction period. The results are tabulated below:

| Hours of radiation: | Percent insolubilization |
|---|---|
| 5 | 8.7 |
| 10 | 23.6 |
| 20 | 39 |

Example 9

One hundred grams of cellulose acetate (38.3 percent acetyl content) and 1 liter of methyl ethyl ketone were charged to a 2 liter resin flask equipped with a stirrer, a condenser (attached to a nitrogen supply and bubbler), a dropping funnel, and a thermowell with thermocouple. The solution was heated to 60° C. and two drops of dibutyl tin dilaurate were added. Then, over a fifty-five minute period, 100 grams of 5-norbornen-2-yl-methyl isocyanate was added. The temperature was held at 60° C. for 21 hours. The cooled solution was transferred to a large beaker and precipitated by the addition of benzene. The cellulose acetate N-(5-norbornen-2-ylmethyl)carbamate radiation convertible polymer was filtered washed 3 times with isopropanol and then dried. Elemental analysis indicated that all the available hydroxyl groups had been converted to carbamate groups. Irradiation of a cast film from the radiation convertible polymer with high energy electrons as in Example 7(B) and determination of the amount of insolubilization gave the results tabulated below:

| Dose, megarads: | Percent insolubilization [1] |
|---|---|
| .024 | 0.0 |
| .23 | 2.6 |
| .63 | 57.1 |
| 1.25 | 74.1 |
| 12.5 | 92.5 |

[1] Acetone at 60° C.

Cast films of the polymer could also be crosslinked by exposure to a 100 watt medium pressure mercury arc. These results are shown in the following table:

| Exposure time, hours: | Percent insolubilization [1] |
|---|---|
| 0 | 0.0 |
| .5 | 52.4 |
| 1 | 65.7 |
| 2 | 82.8 |

[1] Acetone at 60° C.

Prior to irradiation, both cellulose acetate and the cellulose acetate N-(5-norbornen-2-ylmethyl)carbamate radiation convertible polymer were completely soluble in acetone.

Example 10

Ninety grams of a vinyl chloride/vinyl acetate/vinyl alcohol terpolymer (of weight ratio 91:3:6, respectively), and 600 milliliters of ethylene dichloride were charged to a one liter resin flask equipped with a stirrer, a distillation head with a condenser (attached to a nitrogen supply and bubbler), a dropping funnel, and a thermowell with thermocouple. Fifty milliliters of the solution were azeotropically distilled to remove any traces of water that might have been present. First, two drops of dibutyl tin dilaurate and then 20.0 grams of 5-norbornen-2-ylmethyl isocyanate were added over a ten minute period to the solution at 70° C. After one hour, the temperature was raised to reflux and maintained until an infrared spectra of the reaction mixture showed complete reaction of the isocyanate (20 hours). The solution was cooled and transferred to a large beaker. Methanol was added slowly with stirring until the solution was cloudy, then 2 liters of methanol was added quickly. The vinyl chloride/vinyl acetate/vinyl N-(5-norbornen-2-ylmethyl)-carbamate terpolymer was filtered washed three times with methanol and dried in a vacuum oven at 60° C. Elemental analysis indicated complete conversion of available hydroxyl groups to carbamate. Irradiation of 15 mil cast films with an electron beam from a 1 mev. Van de Graaff as in Example 3 and determination of the amount of insolubilization gave the following results:

| Dose, megarads: | Percent insolubilization [1] |
|---|---|
| .08 | 0.0 |
| .28 | 17.6 |
| .49 | 45.8 |
| 1.46 | 79.1 |
| 7.32 | 96.2 |
| 14.7 | 100.0 |

[1] Ethylene dichloride at 60° C.

Films of this material could also be crosslinked by irradiation with ultraviolet light from a 100 watt medium-pressure mercury arc. This data is shown in the following table:

| Exposure time, hours: | Percent insolubilization [1] |
|---|---|
| 0 | 0.0 |
| .5 | 2.8 |
| 1 | 12.7 |
| 2 | 18.4 |
| 5 | 41.6 |
| 20 | 50.4 |

[1] Ethylene dichloride at 60° C.

Further exposure to the mercury arc did not result in additional insolubilization, since the polymer, being light sensitive, showed signs of decomposition upon continued prolonged exposure to UV light.

Example 11

A four percent solution in benzene of the radiation-convertible polymer described in Example 3 was used to treat swatches of 100% wool worsted, cotton print cloth (80 x 80), and 50/50 Dacron-cotton blend fabric by padding. These switches and untreated control swatches were irradiated under nitrogen with high energy electrons from a 3 mev. Van de Graaff accelerator. They were tested after irradiation for Elmensdorf Tear Strength (ASTM D 1424–59), Instron Break in the warp direction (ASTM D 1682–59–T), Stiffness-Cantilever (ASTM D–1388–55–7), Shrinkage (AATCC 99–1962–T) and Wash and Wear properties (AATCC 88A–1964–T). The results of the tests, the weight of radiation convertible polymer added on in the treatment and the radiation dosage are given in the following table.

In the tests, high values are preferred for the Tear Strength, Instron Break and Wash and Wear tests; low values are preferred for the stiffness and shrinkage tests. The results show an over-all improvement in the cloth properties.

In contrast, irradiation of the untreated polyethylene polymer had shown that no insolubles were formed in this range of doses, in all instances the polymer was completely soluble, both before and after irradiation.

Example 13

One hundred grams of an ethylene/ethyl acrylate copolymer (10.8 weight percent ethyl acrylate, 5.5 dg./min. melt index) was charged to a 2 liter resin flask equipped with distillation head and condenser, stirrer, thermowell, electric heating mantle and 25 ml. dropping funnel.

The flask was purged with dry nitrogen and kept under a positive nitrogen pressure for the duration of the reaction. Toluene (500 ml.) was then added and a small amount distilled to remove traces of water. 5-norbornen-2-ylmethyl alcohol (15.0 gms.) and tetrabutyl titanate (0.5 gm.) were added to the hot but not refluxing solution. The solution was again heated to reflux and allowed to reflux for one hour. After this time the solution was cooled to 100° C. and held overnight at this temperature. The next day, after refluxing for one hour to assure completion of the transesterification reaction, 35 ml. of a mixture of toluene and ethanol was stripped off. The solution was cooled slightly and the resin recovered by

WOOL FABRIC

| | Dosage, mrad | Tear strength warp direction, grams | Warp, instron break Lbs. | Warp, instron break Percent, elongation | Stiffness | Shrinkage Warp direction, total percent | Shrinkage Area percent, 5 washes |
|---|---|---|---|---|---|---|---|
| Add-on, percent: | | | | | | | |
| Control | 0 | 2,080 | 21 | 60 | 3.5 | 20.7 | 36 |
| Control-irradiation | 0.5 | 1,980 | 22 | 55 | 3.3 | 22.0 | |
| Do | 3.0 | 1,780 | 21 | 60 | 3.2 | 21.8 | |
| 2 | 1.0 | 2,750 | 35 | 39 | 3.6 | 1.0 | 11.0 |
| 6 | 0.5 | 2,720 | 41 | 46 | 5.5 | 1.2 | 7.1 |
| Do | 3.0 | 2,720 | 40 | 50 | 5.6 | 1.6 | 6.8 |
| 8 | 0.5 | 2,080 | 33 | 45 | 4.6 | 1.0 | 4.9 |
| Do | 3.0 | 1,900 | 34 | 49 | 5.3 | 1.0 | 5.6 |

COTTON

| | Dosage mrad | Tear strength warp direction, grams | Instron break Lbs. | Instron break Percent, elongation | wash/wear |
|---|---|---|---|---|---|
| Add-on percent: | | | | | |
| Control | 0 | 768 | 56 | 13 | 1 |
| Control, irradiation | 0.5 | 704 | 37 | 26 | 2 |
| Do | 3.0 | 528 | 25 | 23 | 3 |
| 2 | 1.0 | 744 | | | 2 |
| 4 | 1.0 | 850 | | | 2 |
| 6 | 0.5 | 792 | 52 | 11 | 4 |
| Do | 3.0 | 672 | | | 4 |
| 50/50 Dacron-cotton | | | | | |
| Control | 0 | 1,000 | 91 | 46 | 5 |
| Control, irradiation | 0.5 | 1,140 | 61 | 35 | 5 |
| Do | 3.0 | 1,240 | 66 | 40 | 4.5 |
| 5 | 0.5 | 1,550 | 112 | 50 | 4 |
| Do | 3.0 | 1,420 | 110 | 52 | 4 |

Example 12

Nine grams of a high density (0.960 gm./cc.), high molecular weight (0.5 dg./min. melt index) polyethylene was milled with one gram of the radiation convertible copolymer of Example 1(B). A five inch plaque, about 22 mils thick, was molded from the blended polymers and samples from these plaques were subjected to irradiation under nitrogen by 1 mev. electrons from a Van de Graaff accelerator. The amount of insolubilization was determined by refluxing for four hours in ethylbenzene under nitrogen, draining and reextracting in fresh refluxing ethylbenzene for one-half hour, then drying in a vacuum oven at 60° C. overnight. The results obtained with the treated polyethylene are shown in the following table.

| Dose, megarads: | Percent insolubilization |
|---|---|
| .055 | 2.5 |
| .14 | 6.3 |
| .28 | 10.1 |
| 1.38 | 23.5 |
| 2.8 | 40.8 | precipitation in methanol and filtration. The polymer was reslurried three times with 2 liter portions of fresh methanol then dried in a vacuum oven at 60°. Analysis by infrared spectrophotometric techniques indicated that a significant amount of norbornenyl group had been incorporated in the resin. The radiation convertible polymer contained the following groups in the molecule:

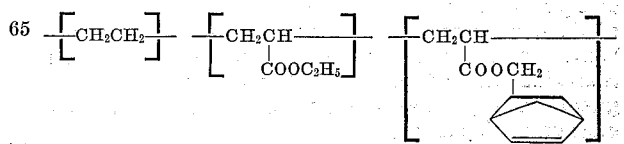

Exposure of a 5 in. diameter, 20 mil thick plaque to ultraviolet irradiation from a 100 watt medium-pressure mercury arc and removal of samples at the stated times gave the following results on extraction of the samples with refluxing ethylbenzene for four hours:

Exposure time (hours): Percent insolubilization
- 0 — 0.0
- .5 — 36.6
- 1 — 44.5
- 2 — 59.8
- 5 — 79.3
- 10 — 90.9
- 20 — 92.2

Irradiation of portions of a molded plaque of the above radiation convertible polymer with high energy electrons from a 1 mev. Van de Graaff accelerator gave the results shown below:

Dose, mrads: Percent insolubilization
- .065 — 0.6
- .129 — 2.0
- .264 — 20.4
- .584 — 40.8
- 1.17 — 61.2
- 2.32 — 78.4
- 6.00 — 87.5
- 12.00 — 93.2

Ultraviolet irradiation of a similar ethylene/5-norbornen-2-ylmethyl acrylate copolymer (0.5 mole percent comonomer charged) made in a high pressure stirred reactor gave the following results:

Exposure time (hours): Percent insolubilization
- 0 — [1] 21.8
- 0.5 — 51.5
- 1 — 65.1
- 2 — 73.0
- 5 — 77.4
- 10 — 82.4
- 20 — 85.0
- 30 — 88.4
- 40 — 87.9
- 50 — 82.2

[1] Average of two determinations.

The data indicates that prolonged exposure, about 40 hours, to ultraviolet light causes decomposition.

Example 14

An eight inch pressure tube was purged with dry nitrogen and cooled to −78° C. with a Dry Ice-acetone bath. Ten milliliters of toluene, seven milliliters of cyclohexene oxide, three milliliters of glycidyl 5-norbornene-2-carboxylate and one milliliter of a solution of triethylaluminum (1 part) in decane (8 parts by weight) were introduced into the cold tube. The tube was sealed with a crown closure and allowed to warm to room temperature. After four days, the viscous solution was poured into 150 ml. of methanol containing 1 percent 2,4-pentanedione. The polymer was recovered by filtration washed several more times with methanol and dried in a vacuum oven at 60° overnight. Elemental analysis indicated that 25.0 percent of the glycidyl 5-norbornen-2-carboxylate charged had been copolymerized. The infrared spectrum of the copolymer had bands at 1730 cm.$^{-1}$ (ester carbonyl) and 739 cm.$^{-1}$ (norbornene double bond) which is also indicative of copolymerization through the glycidyl group. The copolymer was a radiation convertible polyether containing the groups:

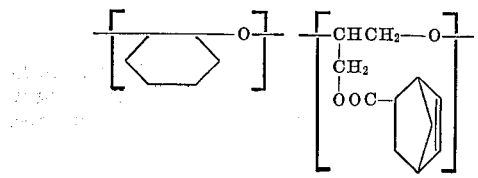

The pendant radiation convertible polymers produced with epoxides can use any vicinal epoxide containing from 2 to about 8 carbon atoms, such as ethylene oxide, propylene oxide, 1,2-butylene oxide, 2,3-butylene oxide, cyclohexene oxide, styrene oxide and the like. Also useful are the oxides of the compounds of Formula IX, as illustrated in Example 9, in which the oxirane ring is on the substituent group and not on the norbornenyl ring structure.

The pendant epoxynorbornene carboxylate polymers and copolymers and the pendant epoxalkylnorbornene carboxylate polymers and copolymers are within the scope of this invention and are readily cured and crosslinked by irradiation.

In addition, radiation convertible polymers produced by the reaction of a functionally substituted norbornene with a preformed polymer containing a group reactive with the functional group of said norbornene are also within the scope of this invention; the radiation convertible polymers so produced may be of both the backbone or pendant types. The functional group can be, for example, amido, glycyl, carbamyl, formyl, hydroxyl, amino, imino, carboxyl, carboalkoxy, carboxamido haloformyl, ureylene, iminodicarbonyl, and the like. These radiation polymers include the following classes:

Vinyl N-(norbornenyl)carbamate polymers and copolymers with other vinyl monomers
Vinyl N-(norbornenylalkyl)carbamate polymers and copolymers with other vinyl monomers
Vinyl norbornenyl ether polymers and copolymers with other vinyl monomers
Vinyl norbornenylalkyl ether polymers and copolymers with other vinyl monomers
Vinyl norbornenyl ketone polymers and copolymers with other vinyl monomers
Vinyl norbornenylalkyl ketone polymers and copolymers with other vinyl monomers
Vinyl norbornenylcarboxylate polymers and copolymers with other vinyl monomers
Vinyl norbornenylalkylcarboxylate polymers and copolymers with other vinyl monomers
Vinyl norbornenylcarboxamide polymers and copolymers with other vinyl monomers
Vinyl norbornenylalkylcarboxamide polymers and copolymers with other vinyl monomers
Vinyl norbornenylallophonate polymers and copolymers with other vinyl monomers
Vinyl norbornenylalkylallophonate polymers and copolymers with other vinyl monomers
Vinyl iminodicarbonylnorbornene polymers and copolymers with other vinyl monomers
Vinyl iminodicarbonylalkylnorbornene polymers and copolymers with other vinyl monomers
Norbornenylcarboxyl phenolic polymers
Norbornenylalkylcarboxyl phenolic polymers
N-(Norbornenyl)carbamyl phenolic polymers
N-(Norbornenylalkyl)carbamyl phenolic polymers
N-(Norbornenylcarbonyl) polyamides
N-(Norbornenylalkylcarbonyl) polyamides
N-(Norbornenylcarbamyl) polyamides
N-(Norbornenylalkylcarbamyl) polyamides
Norbornenylcarboxyl polyethers
Norbornenylalkylcarboxyl polyethers
N-(Norbornenylcarbamyl) polyethers
N-(Norbornenylalkyl)carbamyl polyethers
Norbornenylcarboxylates of cellulosic derivatives
Norbornenylalkylcarboxylates of cellulosic derivatives
N-(Norbornenyl)carbamates of cellulosic derivatives
N-(Norbornenylalkyl)carbamates of cellulosic derivatives
N-(Norbornenylcarbamyl) polyurethanes
N-(Norbornenylalkylcarbamyl) polyurethanes
N-(Norbornenylcarbonyl) polyurethanes
N-(Norbornenylalkylcarbonyl) polyurethanes
N-(Norbornenylcarbamyl) polyureas
N-(Norbornenylalkylcarbamyl) polyureas N-(Norbornenylcarbonyl) polyureas
N-(Norbornenylalkylcarbonyl) polyureas
N-(Norbornenylcarbamyl) polysiloxanes and copolymers
N-(Norbornenylalkylcarbamyl) polysiloxanes and copolymers
N-(Norbornenylalkylcarbamyl)alkyl polysiloxanes and copolymers
Norbornenylcarboxyl polysiloxanes and copolymers
Norbornenylcarboxylalkyl polysiloxanes and copolymers
N-(Norbornenyl)ureylenealkyl polysiloxanes and copolymers
N-(Norbornenylalkyl)ureylenealkyl polysiloxanes and copolymers
N-(Norbornenyl)amidoalkyl polysiloxanes and copolymers
N-(Norbornenylalkyl)amidoalkyl polysiloxanes and copolymers.

Example 15

A 20% solution of a phenoxy resin, the polyhydroxyether of 2,2-bis(4-hydroxyphenyl)propane having the polymerized units

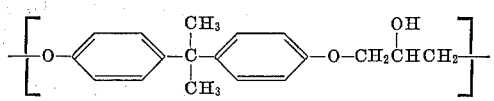

in dioxane was prepared by adding the resin (100 g.) to Matheson, Coleman and Bell Spectroquality dioxane (400 g.). The resulting mixture was rolled until all of the resin as dissolved and a viscous solution resulted. This solution was used as a master batch and each modified sample was prepared in the following manner.

A solution was prepared containing 125.0 g. of the master batch, 0.25 g. of 5-isocyanatomethyl-2-norbornene, 0.25 g. of xanthen-2-one and 2 drops of dibutyl tin dilaurate catalyst. This solution was rolled on the rollers overnight. The dioxane was removed from the resin by evaporation under vacuum at 90° C. The dry resin was compression molded into plaques. The resin is crosslinked by exposure to ultraviolet radiation or irradiation in a Van de Graaff accelerator.

The radiation convertible polymer before exposure to radiation contained units of the following structure in the molecule

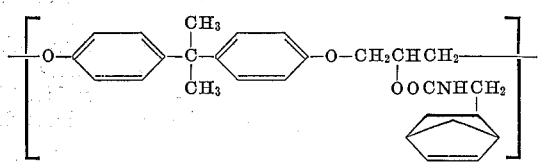

Example 16

A silicone base fluid was prepared by heating 800 gms. of dimethylsiloxane cyclic tetramer, 120 gms. of a trimethylsiloxane end capped dimethylsiloxane trimer (2 centistokes viscosity) and 80 gms. of 4-aminobutylmethylsiloxane cyclic tetramer at 90° C. with stirring under nitrogen for twenty minutes; 20 p.p.m. of tetramethylammonium silanolate was then added and the temperature maintained at 90° C. for four hours. After standing at room temperature overnight the mixture was heated to 200° C. and sparged with nitrogen for two hours with stirring to remove volatile material.

The radiation convertible silicone fluid was prepared by dissolving 50 gms. of the silicone base fluid in 50 ml. of toluene and adding 4.5 gms. of 5-norbornen-2-ylmethyl isocyanate, dropwise over a ten minute period. During the addition the temperature rose from 26° C. to 36° C. The solution was stirred under nitrogen for 1.5 hours, refluxed for thirty minutes, and then the toluene was stripped from the silicone fluid by sparging with nitrogen. The residue was cooled and stored under nitrogen. The Brookfield viscosity of the product was 12,600 cps. On irradiation in a Van de Graaff accelerator the product crosslinks and becomes less soluble.

Example 17

A silicone gum stock was prepared by heating 490 gms. of dimethylsiloxane cyclic tetramer, 10 gms. of 4-aminobutylmethyl siloxane cyclic tetrame, and 30 p.p.m. potassium silanolate catalyst at 150° C. for four hours under nitrogen with a constant temperature oil bath. The gum stock was cooled and blended with 2 phr. of fumed silica stabilizer on a 2 roll mill. The radiation convertible silicone gum stock was prepared by blending 102 gms. of the above resin with 2.25 gms. of 5-norbornen-2-ylmethyl isocyanate on a roll mill at room temperature for one hour. On exposure to 1 mev. electron irradiation the radiation convertible polymer blend readily crosslinks; with a dose of only 1 mrad, 84 percent insolubilization had occurred and the product was now a rubbery elastomer.

Example 18

A phenol/formaldehyde novolak (acid catalyzed) resin having a ball and ring softening temperature of 240–260° F., 100 gms., was dissolved in 500 ml. of methyl isobutyl ketone (previously dried over molecular sieves). The solution was heated to 80° C. with stirring under nitrogen and two drops of dibutyl tin dilaurate were added. Then 5-norbornen-2-ylmethyl isocyanate, 47 gms., was added dropwise over a forty minute period. The temperature was maintained at between 80° and 100° C. until examination of the solution by infrared indicated complete reaction of the isocyanate (2 days). The product was recovered by precipitation with benzene and filtration. The radiation convertible resin was washed three times with benzene and dried in a vacuum oven at 60° C. On exposure to Van de Graaff radiation it crosslinks.

The radiation convertible phenolic polymer contained the following units in the molecule before irradiation:

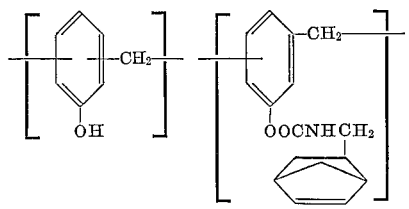

The radiation convertible silicon polymers of Examples 16 and 17 contained the following polymerized units in the molecule before irradiation:

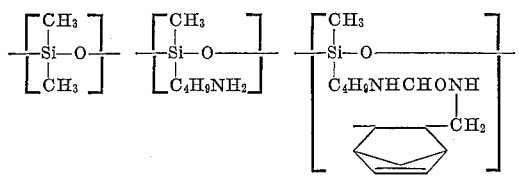

The uncured radiation convertible polymers find use in many applications. Thus, they can be used to produce textile coating compositions, in latices, in conventional paint formulations, in elastomers, extruded into fibers, films, rods, etc., which can then be cured by irradiation. They can also be used to impregnate or coat paper, wood, metal surfaces, and other substrates by conventional means.

In instant application the terms polyesters, polyamides, polyurethanes, etc. include all of those compounds containing more than one ester, amide, urethane, etc. group in the polymer molecule, whether this group is in the chain or on a substituent group pendant thereto.

Example 19

A polyester was produced by heating a mixture of 4,100 grams of bicyclo[2.2.1]hept-5-en-2,3-dicarboxylic acid anhydride, 5,400 grams of 2,2-dimethyl-3-hydroxypropyl 2,2 dimethyl-3-hydroxypropionate, 240 grams of pentaerythritol and 260 grams of xylene at 200° C. for 24 hours. The molten polyester was purged with dry nitrogen to remove volatile material and cooled. It had an acid number of 10.4 and a reduced viscosity of 0.047 dl./g. determined at 30° C. using a 0.5 percent benzene solution.

A 70 gram portion of the polyester was dissolved in 17 grams of 2-butoxyethyl acrylate and 13 grams of neopentyl glycol diacrylate to produce a solution having a Brookfield viscosity of 4,280 c.p.s. at 28° C. To this solution there were added 2.29 grams of bis(2-isocyanatoethyl)bicyclo[2.2.1]hept-5-en-2,3-dicarboxylate and the reaction mixture was stirred and left standing. Two days later the solution had a reduced viscosity of 0.039 dl./g. determined at 30° C. using a 0.5 percent benzene solution. The product was used to coat glass slides that were subsequently exposed to ultraviolet light from a 100 watt mercury arc at a distance of 4 inches. The film coatings were completely cured in 34 minutes. Films of the polyester with 1 percent of 4-methoxypropiophenone cured in 15 minutes and films containing 1 percent benzophenone cured in 10 minutes.

Example 20

A polyester containing the repeating unit

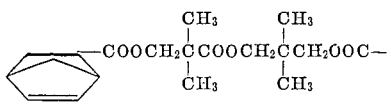

was produced by initially reacting 98.1 parts of maleic anhydride and 224.4 parts of 2,2-dimethyl-3-hydroxypropyl 2,2-dimethyl-3-hydroxypropionate in about 15 parts of xylene at 190° to 200° C. until the solution had an acid number of 10. At this point 66 parts of dicyclopentadiene was added in a dropwise manner over a thirty minute period while a temperature of about 170° C. was maintained. The mixture was heated at about 200° C. for another two hours and the solvent was then distilled at reduced pressure. The amount of dicyclopentadiene added was sufficient to convert only 50 percent of the unsaturation from the maleic anhydride to norbornenyl nuclei.

A 100 percent solids coating composition was produced by mixing 70 parts of the liquid polyester with 20 parts of tetramethylene diacrylate and 10 parts of 2-ethylhexyl acrylate. This composition was used to coat steel panels that were exposed to irradiation from an electron beam accelerator to impart a dose of 20 megarads; the coatings cured and crosslinked.

Example 21

A reaction vessel was charged with 300 grams of polyethylene glycol having an average molecular weight of about 600 and 45.1 grams of 2-ethoxyethanol. While stirring 320.3 grams of bis(2-isocyanatoethyl)bicyclo[2.2.1]hept-5-en-2,3-dicarboxylate were added in one portion. An exothermic reaction occurred with the temperature rising to about 110° C. to 120° C. After stirring for about 1.5 hours at about 80° C. there were added 22.8 grams of trimethylolpropane and stirring was continued at about 100° C. for another 45 minutes. There was produced 653 grams of a tacky urethane polymer having an inherent viscosity of 0.23 at 30° C. using a 0.5 percent solution in meta-cresol. The polymer can be represented by the general formula:

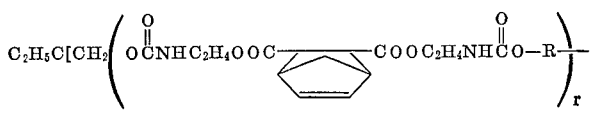

wherein R is —(CH$_2$CH$_2$O)$_x$CH$_2$CH$_2$—, $x$ has a value of about 12 and $r$ is an integer. Films having a thickness of ten mils were cast on glass plates and exposed at a distance of one foot to ultraviolet light irradiation from a 550 watt mercury arc. The urethane polymer cured to a hard film in 40 minutes. Films of the urethane polymer containing one percent p-methoxyacetophenone cured in 15 minutes and with one percent 3-chloroxanthone cured in 20 minutes.

Example 22

In a manner similar to that described in Example 19, an urethane polymer was produced by the reaction of 490 grams of a polycaprolactone diol having an average molecular weight of about 530, 320.3 grams of di(2-isocyanatoethyl)bicyclo[2.2.1]hept-5-en-2,3-dicarboxylate and 12 grams of 2-ethoxyethanol added in two separate six grams portions. There was produced 817.4 grams of a tacky urethane polymer having an inherent viscosity of 0.42 as determined from a 0.5 percent solution in m-cresol at 30° C. The polymer can be represented by the following formula:

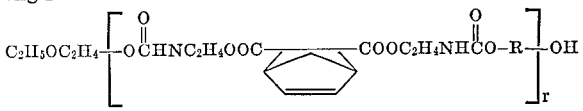

in which R is

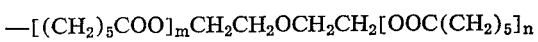

wherein $m$ and $n$ have an average sum total of about 3.5 and $r$ is an integer.

Films, 10 mils thick, were produced from the a blend of the polymer containing one weight percent p-methoxybenzophenone and then irradiated for 25 minutes and cured to a hard film, as described in Example 21 with a 550 watt mercury arc. The film properties of the irradiated polymer are tabulated below:

Stiffness, p.s.i.—377
Tensile, p.s.i.—181
Elongation, percent—98
Crosslink percent—90

Example 23

To a solution of 142 grams of acrylamide in 200 ml. of dry methanol there were slowly added 150 grams of freshly distilled cyclopentadiene. The mixture was stirred at 50° C. for 4 hours, cooled to −30° C. and the crystals which formed were filtered and recrystallized twice from hot methanol. Thirty-three grams of the crystalline bicyclo[2.2.1]hept-5-en-2-carboxamide and 21.6 grams of 40 percent aqueous formaldehyde were added to 100 ml. of methanol. The pH was adjusted to 8–9 and the mixture was refluxed for 2 hours to produce a solution of N-methylolbicyclo[2.2.1]hept-5-en-2-carboxamide. To the solution there was added 0.4 gram of a nonionic detergent which is the adduct of 9 moles of ethylene oxide with a mixture of C$_{11}$–C$_{15}$ linear alcohols and the solution was diluted to 10 percent concentration with acetone. Cellulose, in the form of cotton fabric, was padded with the solution to a dry pick-up of about 2 weight percent, the cellulose was dried at 150° F. for 5 minutes, padded with a 3 percent magnesium chloride solution and then heated at 310° F. for three minutes to react the N-methylolbicyclo[2.2.1]hept-5-en-2-carboxamide with the hydroxyl group of the cellulose. The fabric was then padded with the same solution to 100 percent pickup and finally given a 2 megarad dose in a 2 mev. Van de Graaff accelerator. The crease recovery of the treated fabric was 204°, whereas, the crease recovery of the untreated fabric was 160° C. The improved crease recovery is an indication that the norbornenyl containing modified cellulose had cured and crosslinked.

Example 24

A mixture of 379 grams of bicyclo[2.2.1]hept-5-en-2,3-dicarboxylic acid anhydride and two liters of concentrated aqueous ammonia was refluxed for 9 hours. The solid material dissolved and the temperature was about 100° C. After cooling, filtering and drying there was obtained 330 grams of bicyclo[2.2.1]hept-5-en-2,3-carboximide having a melting point of 186–187° C. A solution of 34.6 grams of said carboximide in 18 grams of 40 percent formaldehyde solution was adjusted to a pH of 8–9 and heated at 70° C. for two hours to produce a solution of N-methylolbicyclo[2.2.1]hept-5-en-2,3-carboximide. To this solution there was added 0.4 gram of a nonionic detergent which is the adduct of 9 moles of ethylene oxide with a mixture of $C_{11}$–$C_{15}$ linear alcohols and the solution was diluted with 360 ml. of a 1:1 methanol-water solution. A cellulose fabric, cotton, was padded with the solution to a dry pick-up of about 4.5 weight percent, the fabric was dried at 150° F. for 5 minutes, padded with a 3 percent magnesium chloride solution and then heated at 310° F. for three minutes to react the N-methylolbicyclo[2.2.1]hept-5-en-2,3-carboximide with the hydroxyl group of the cellulose. The treated fabric was irradiated as described in Example 23. The crease recovery of the treated fabric was 224° compared to 160° for the untreated fabric.

What is claimed is:

1. A radiation cured norbornenyl polymer composition comprising a member selected from the group consisting of (i) backbone radiation convertible polymers containing the divalent norbornenyl structure selected from the group consisting of

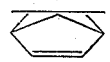

and

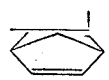

in the polymer backbone and (ii) pendant radiation convertible polymers containing a monovalent norbornenyl structure of the formula

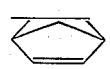

pendant to the polymer backbone; said radiation cured norbornenyl polymer crosslinked by exposure to particulate ionizing radiation, non-particulate ionizing radiation, or non-ionizing radiation.

2. A radiation cured norbornenyl polymer as claimed in claim 1, wherein the radiation is particulate ionizing radiation.

3. A radiation cured norbornenyl polymer as claimed in claim 1, wherein the radiation is non-particulate ionizing radiation of from about $10^{-3}$ angstrom to about 2000 angstroms.

4. A radiation cured norbornenyl polymer as claimed in claim 1, wherein the radiation is non-ionizing radiation of from about 2000 angstroms to about 8000 angstroms.

5. A radiation cured norbornenyl polymer as claimed in claim 1, wherein the backbone radiation convertible polymer is selected from the group consisting of backbone radiation convertible polyesters, backbone radiation convertible polyamides, backbone radiation convertible polyethers, backbone radiation convertible polyurethanes, backbone radiation convertible polyureas, backbone radiation convertible polylactones, and backbone radiation convertible vinyl polymers; said backbone radiation convertible polymers containing the divalent norbornenyl structure selected from the group consisting of

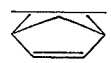

and

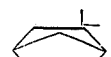

in the polymer backbone.

6. A radiation cured backbone norbornenyl polymer as claimed in claim 5, wherein the backbone radiation convertible polyester contained the polymerized unit

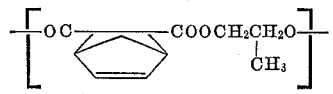

7. A radiation cured backbone norbornenyl polymer as claimed in claim 5, wherein the backbone radiation convertible polyamide contained the polymerized unit

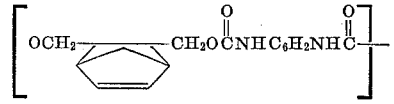

8. A radiation cured norbornenyl polymer as claimed in claim 1, wherein the pendant radiation convertible polymer is selected from the group consisting of
(A) the pendant radiation convertible copolymers of
(i) a member selected from the group consisting of a polymerizable ethylenically unsaturated monomer and a vicinal epoxide containing from 2 to about 8 carbon atoms with (ii) a member of the group consisting of the norbornenyl compounds of the structure

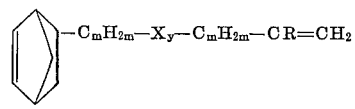

and epoxides thereof wherein the oxirane ring of said epoxides is located in the chain of the norbornenyl compound, wherein R is a member of the group hydrogen, alkyl of from 1 to 3 carbon atoms and chlorine, $m$ has a value of from 0 to 4, X is a member of the group consisting of keto group, ether linkage, ester group, amide group, and urethane group, and $y$ has a value of from 0 to 1,
(B) the pendant radiation convertible polyesters,
(C) the pendant radiation convertible polyamides,
(D) the pendant radiation convertible polyethers,
(E) the pendant radiation convertible urethane polymers,
(F) the pendant radiation convertible phenolic polymers,
(G) the pendant radiation convertible cellulose acetates,
(H) the pendant radiation convertible silicon polymers, and
(I) the pendant radiation convertible cellulose polymers, said pendant radiation convertible polymers containing the monovalent norbornenyl structure

attached to the polymer chain via a monovalent bond.

9. A radiation cured pendant norbornenyl polymer as claimed in claim 8, wherein the pendant radiation convertible polymer contained the polymerized units

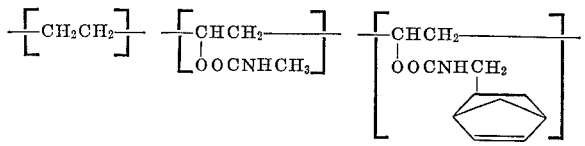

10. A radiation cured pendant norbornenyl polymer as claimed in claim 8, wherein the pendant radiation convertible polymer contained the polymerized units

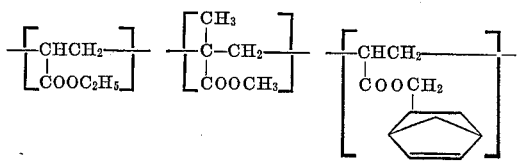

11. A radiation cured pendant norbornenyl polymer as claimed in claim 8, wherein the pendant radiation convertible polymer contained the polymerized units

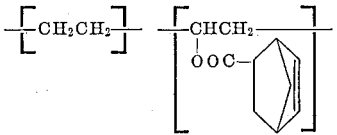

12. A radiation cured pendant norbornenyl polymer as claimed in claim 8, wherein the pendant radiation convertible polymer contained the polymerized units

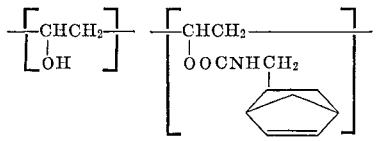

13. A radiation cured pendant norbornenyl polymer as claimed in claim 8, wherein the pendant radiation convertible polymer contained the polymerized units

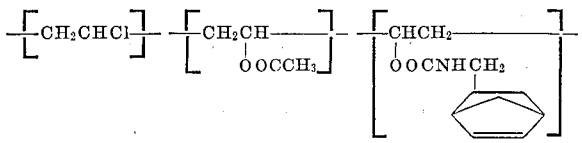

14. A radiation cured pendant norbornenyl polymer as claimed in claim 8, wherein the pendant radiation convertible polymer contained the polymerized units

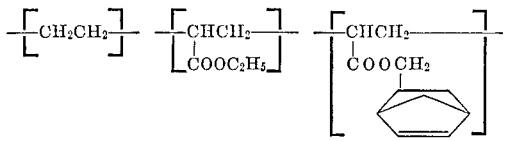

15. A radiation cured pendant norbornenyl polymer as claimed in claim 8, wherein the pendant radiation convertible polymer contained the polymerized units

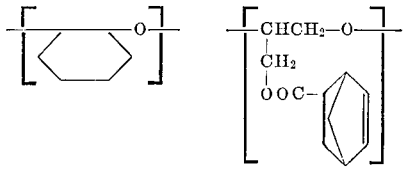

16. A radiation cured pendant norbornenyl polymer as claimed in claim 8, wherein the pendant radiation convertible polymer contained the polymerized units

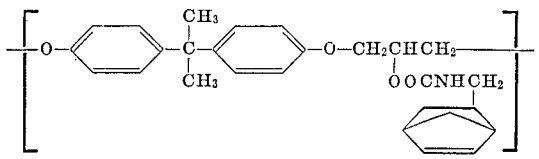

17. A radiation cured pendant norbornenyl polymer as claimed in claim 8, wherein the pendant radiation convertible polymer contained the polymerized units

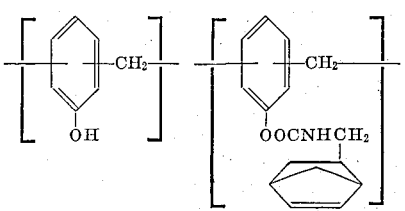

18. A radiation cured pendant norbornenyl polymer as claimed in claim 8, wherein the pendant radiation convertible polymer contained the polymerized units

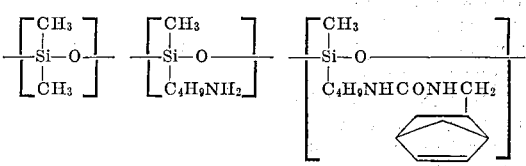

19. A radiation cured pendant norbornenyl polymer as claimed in claim 8, wherein the pendant radiation convertible polymer is cellulose acetate N-(5-norbornen-2-ylmethyl)carbamate.

20. A composition comprising a blend of a radiation cured norbornenyl polymer as claimed in claim 1 and a polymer.

21. A composition comprising a substrate and a radiation cured norbornenyl polymer as claimed in claim 1.

22. A composition as claimed in claim 21, wherein the substrate is a fabric.

References Cited
UNITED STATES PATENTS

| | | | |
|---|---|---|---|
| 3,330,815 | 7/1967 | McKeon et al. | 260—93.1 |
| 3,200,174 | 8/1965 | Adamek et al. | 260—889 |
| 3,140,275 | 7/1964 | Spooncer | 260—86.7 |
| 3,063,973 | 11/1962 | Gladding et al. | 260—79.5 |
| 2,981,668 | 4/1961 | Brosch | 204—159.2 |
| 2,961,389 | 11/1960 | Hinos et al. | 204—159.2 |

SAMUEL H. BLECH, Primary Examiner

R. B. TURER, Assistant Examiner

U.S. Cl. X.R.

117—143, 161; 204—159.13, 159.14, 159.19, 159.2; 260—2.5, 17, 46.5, 47, 59, 75, 77.5 78, 78.3, 80.6, 80.8, 80.81, 86.1, 86.7, 89.3, 333, 346.1, 346.2, 348, 405.5, 453, 468, 478, 482, 486, 489, 514, 557, 561, 587, 611, 827, 857, 858, 873, 874, 897, 898, 899, 901